United States Patent
Estevez et al.

(10) Patent No.: US 12,075,279 B2
(45) Date of Patent: Aug. 27, 2024

(54) METHOD AND APPARATUS FOR DETERMINING ANALYTICS FOR SERVICE EXPERIENCE FOR A NETWORK SLICE INSTANCE

(71) Applicant: Samsung Electronics Co., Ltd., Suwon-si (KR)

(72) Inventors: David Gutierrez Estevez, Staines (GB); Andrew Bennett, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/146,769

(22) Filed: Dec. 27, 2022

(65) Prior Publication Data

US 2023/0140532 A1    May 4, 2023

Related U.S. Application Data

(63) Continuation of application No. 17/036,367, filed on Sep. 29, 2020, now Pat. No. 11,540,165.

(30) Foreign Application Priority Data

Oct. 4, 2019   (GB) ...................................... 1914393
Feb. 18, 2020  (GB) ...................................... 2002219

(Continued)

(51) Int. Cl.
*H04W 28/02*    (2009.01)
*H04W 24/08*    (2009.01)

(52) U.S. Cl.
CPC ....... *H04W 28/0268* (2013.01); *H04W 24/08* (2013.01)

(58) Field of Classification Search
CPC ............. H04W 28/0268; H04W 28/16; H04W 24/08; H04W 24/02; H04W 4/60;
(Continued)

(56) References Cited

U.S. PATENT DOCUMENTS 11,071,055 B1    7/2021    Wang et al.
11,558,770 B2    1/2023    Xin et al.
(Continued)

FOREIGN PATENT DOCUMENTS

CN    110149657 A       8/2019
WO    2019/032968 A1    2/2019
(Continued)

OTHER PUBLICATIONS

3rd Generation Partnership Project; Technical Specification Group Services and System Aspects; Study of Enablers for Network Automation for 5G (Release 16), 3GPP TR 23.791 V16.2.0, Jun. 11, 2019, Sophia Antipolis, France.
(Continued)

*Primary Examiner* — Khaled M Kassim
*Assistant Examiner* — H R
(74) *Attorney, Agent, or Firm* — Jefferson IP Law, LLP

(57) ABSTRACT

A method for determining analytics for service experience for a Network Slice instance in a network comprising one or more network entities is provided. The method includes obtaining first information for determining a mapping between a set of one or more user equipment (UEs) and a set of one or more Network Slice instances, obtaining second information for determining the analytics of the set of one or more UEs, and determining the analytics for a Network Slice instance based on the first information and the second information.

12 Claims, 13 Drawing Sheets

(30) Foreign Application Priority Data

Apr. 24, 2020 (GB) .................................... 2006083
Jun. 26, 2020 (GB) .................................... 2009805

(58) Field of Classification Search
CPC ....... H04W 4/80; H04W 4/029; H04W 76/10;
H04W 76/14; H04L 41/0803; H04L
41/0895; H04L 41/14; H04L 41/40; H04L
41/5019; H04L 41/5067; H04L 41/0823;
H04L 41/5009
See application file for complete search history.

(56) References Cited

U.S. PATENT DOCUMENTS

| | | | |
|---|---|---|---|
| 2019/0222489 A1 | 7/2019 | Shan | |
| 2020/0112907 A1* | 4/2020 | Dao | ............... H04M 15/8016 |
| 2020/0196169 A1* | 6/2020 | Dao | ................... H04W 24/08 |
| 2020/0322775 A1 | 10/2020 | Lee et al. | |
| 2020/0344625 A1 | 10/2020 | Xin et al. | |
| 2020/0358670 A1* | 11/2020 | Lee | ................... H04L 41/5067 |
| 2020/0366567 A1 | 11/2020 | Li | |
| 2021/0014141 A1* | 1/2021 | Patil | ...................... H04W 76/25 |
| 2021/0352575 A1 | 11/2021 | Chun | |
| 2022/0022090 A1 | 1/2022 | Schliwa-Bertling et al. | |
| 2022/0070071 A1* | 3/2022 | Poe | ........................ H04L 41/14 |

FOREIGN PATENT DOCUMENTS

| | | |
|---|---|---|
| WO | 2019/119435 A1 | 6/2019 |
| WO | 2019/137195 A1 | 7/2019 |

OTHER PUBLICATIONS

3rd Generation Partnership Project; Technical Specification Group Services and System Aspects; Architecture enhancements for 5G System (5GS) to support network data analytics services (Release 16), 3GPP TS 23.288 V16.1.0, Sep. 24, 2019, Sophia Antipolis, France.

3rd Generation Partnership Project; Technical Specification Group Services and System Aspects; Policy and Charging Control Framework for the 5G System (5GS); Stage 2 (Release 16), 3GPP TS 23.503 V16.2.0, Sep. 24, 2019, Sophia Antipolis, France.

International Search Report dated Dec. 23, 2020, issued in International Application No. PCT/KR2020/013414.

Extended European Search Report dated Sep. 14, 2022, issued in European Patent Application No. 20870560.8-1218.

Samsung; Observed serviced experience analytics for a slice; 3GPP TSG-SA WG2 Meeting #134; S2-1907353; Jun. 24-28, 2019; Sapporo, Japan.

Chinese Office Action with English translation dated Jun. 27, 2024; Chinese Appln. No. 202080070117.0.

* cited by examiner

METHOD AND APPARATUS FOR DETERMINING ANALYTICS FOR SERVICE EXPERIENCE FOR A NETWORK SLICE INSTANCE

CROSS-REFERENCE TO RELATED APPLICATION(S)

This application is a continuation application of prior application Ser. No. 17/036,367 filed on Sep. 29, 2020, which issued as U.S. Pat. No. 11,540,165 on Dec. 27, 2022; and which is based on and claims priority under 35 U.S.C. § 119(a) of a United Kingdom patent application number 1914393.2, filed on Oct. 4, 2019, in the United Kingdom Intellectual Property Office, of a United Kingdom patent application number 2002219.0, filed on Feb. 18, 2020, in the United Kingdom Intellectual Property Office, of a United Kingdom patent application number 2006083.6, filed on Apr. 24, 2020, in the United Kingdom Intellectual Property Office, and of a United Kingdom patent application number 2009805.9, filed on Jun. 26, 2020, in the United Kingdom Intellectual Property Office, the disclosure of each of which is incorporated by reference herein in its entirety.

BACKGROUND

1. Field

The disclosure relates to methods, apparatus and systems for determining analytics for service experience for a Network Slice instance in a network. More particularly, the disclosure relates to methods, apparatus and systems for performing management of quality of experience (QoE) in a network. For example, certain examples of the disclosure provide methods, apparatus and systems for management of network slice instance (NSI)-level QoE in $3^{rd}$ generation partnership project (3GPP) 5G core network (5GC) using network data analytics function (NWDAF).

2. Description of Related Art

To meet the demand for wireless data traffic having increased since deployment of $4^{th}$ generation (4G) communication systems, efforts have been made to develop an improved $5^{th}$ generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analysing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for determining analytics for service experience for a Network Slice instance in a network comprising one or more network entities, the method comprising obtaining first information for determining a mapping between a set of one or more user equipment (UEs) and a set of one or more Network Slice instances, obtaining second information for determining the analytics of the set of one or more UEs, and determining the analytics for a Network Slice instance based on the first information and the second information.

Additional aspects will be set forth in part in the description which follows and, in part, will be apparent from the description, or may be learned by practice of the presented embodiments.

In an embodiment of the disclosure, the method further comprising receiving a request for service experience analytics, and in response to the request, transmitting service experience analytics based on the determined analytics for the Network Slice instance.

In an embodiment of the disclosure, the request comprises one or more of a request for a single report of the service experience analytics, and a request for a subscription to periodic reports of the service experience analytics.

In an embodiment of the disclosure, the method further comprising determining, by a first network entity, that service experience analytics are required, and in response to determining that service experience analytics are required, transmitting, by the first network entity, the request for service experience analytics.

In an embodiment of the disclosure, the request for service experience analytics includes one or more analytics filters.

In an embodiment of the disclosure, the obtaining the first information comprises determining the set of one or more UEs according to one or more analytics filters.

In an embodiment of the disclosure, the obtaining the first information comprises determining, by a second network entity, whether the first information is available at the second network entity, and if the first information is not available at the second network entity, transmitting, to a third network entity, a request for the first information.

In an embodiment of the disclosure, the request for the first information comprises one or more analytics filters.

In an embodiment of the disclosure, at least one of the analytics filters is specified by a first network entity.

In an embodiment of the disclosure, the one or more analytics filters include filtering UEs based on one or more of an Area of Interest, one or more single network slice selection assistance information (S-NSSAI), and one or more Network Slice instance identifier (ID)s.

In an embodiment of the disclosure, the obtaining the first information comprises obtaining information indicating which UEs have been allocated to which Network Slice instances.

In an embodiment of the disclosure, the obtaining the first information comprises receiving, from a third network entity, one or more of a message indicating which UEs (e.g., using UE IDs) are currently allocated to a Network Slice instance, one or more messages, each message indicating that a UE has been newly allocated to a Network Slice instance, and one or more messages, each message indicating that a UE has been newly de-allocated from a Network Slice instance.

In an embodiment of the disclosure, the obtaining the second information is performed by a second network entity.

In an embodiment of the disclosure, the Network Slice instance analytics does not include IDs of the UEs, does include IDs of the UEs, includes a mapping for identifying Network Slice instances deployed within a Network Slice, includes a per-Network Slice instance service experience metric, and/or includes a mapping for identifying applications running on an Network Slice instance and/or on a Network Slice.

In an embodiment of the disclosure, one or more of the network is a 3GPP 5G System (5GS) (e.g., comprising 5GC) network, The first network entity comprises a Network Slice Selection Function (NSSF) entity, the second network entity comprises an NWDAF entity, the third network entity comprises an access and mobility management unction (AMF) entity, the Area of Interest comprises a set of one or more parameters (e.g., Tracking Area Identities (TAIs)), the request for the Network Slice instance analytics comprises an Nnwdaf_AnalyticsInfo_Request message or an Nnwdaf_AnalyticsSubscription_Subscribe message, the response to the request for the Network Slice instance analytics comprises an Nnwdaf_AnalyticsInfo_Request Response message or an Nnwdaf_AnalyticsSubscription_ Notify message, the request for the first information comprises an Namf_EventExposure_Subscribe Request message, the message indicating which UEs are currently allocated to an Network Slice instance comprises a Namf_EventExposure_Subscribe Response message, and the message indicating that a UE has been newly allocated to a Network Slice instance and the message indicating that a UE has been newly de-allocated from a Network Slice instance comprises an Namf_EventExposure_Notify message.

In an embodiment of the disclosure, the network comprising a first entity, a second entity and a third entity, the network being configured to perform the method.

In accordance with an aspect of the disclosure, a computer program comprising instructions which, when the program is executed by a computer, cause the computer to carry out the method is provided.

In accordance with another aspect of the disclosure, a computer-readable data carrier having stored there on the computer program is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
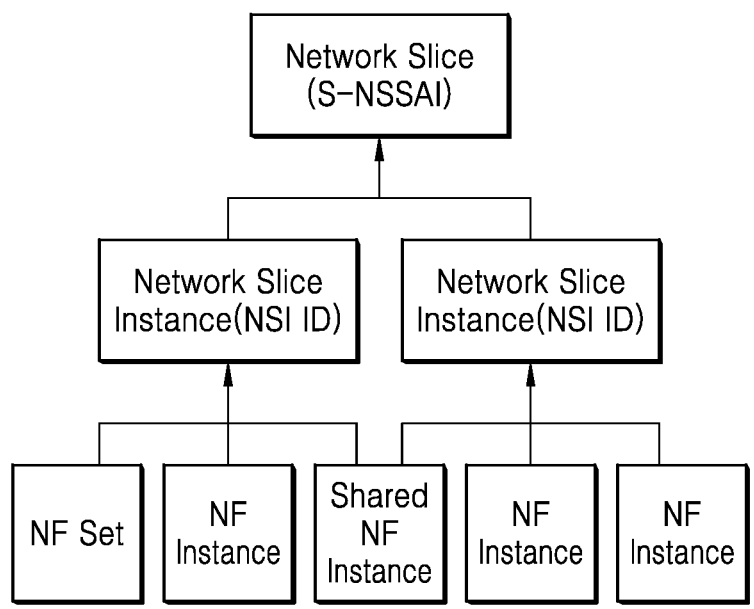
FIG. 1 illustrates a composition of an S-NSSAI according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Abbreviations

In the disclosure, the following acronyms are used.

| 3GPP | 3rd Generation Partnership Project |
| --- | --- |
| 5G | 5th Generation |
| 5G-AN | 5G Access Network |
| 5GC | 5G Core Network |
| 5GS | 5G System |
| AF | Application Function |
| AMF | Access and Mobility Management Function |
| DNN | Data Network Name |
| eNA | enablers for Network Automation |
| GPSI | General Public Subscription Identifier |
| HPLMN | Home Public Land Mobile Network |
| HR | Home Routed |
| ID | Identifier |
| IP | Internet Protocol |
| LBO | Local Break Out |
| MOS | Mean Opinion Score |
| N3GPP | Non-3GPP |
| NEF | Network Exposure Function |
| NF | Network Function |
| NR | New Radio |
| NRF | Network Repository Function |
| NS | Network Slice |
| NSI | Network Slice Instance/instance |
| NSI ID | Network Slice Instance/instance Identifier |
| NSSAI | Network Slice Selection Assistance Information |
| NSSF | Network Slice Selection Function |
| NWDAF | Network Data Analytics Function |
| OAM | Operation and Maintenance |
| PCF | Policy Control Function |
| PDU | Protocol Data Unit |
| PLMN | Public Land Mobile Network |
| QFI | QoS Flow Identifier |
| QoE | Quality of Experience |
| QoS | Quality of Service |
| Rel | Release |
| RSRP | Reference Signal Received Power |
| RSRQ | Reference Signal Received Quality |
| SA2 | Service and System Aspects Working Group 2 |
| SCP | Service Communications Proxy |
| SINR | Signal-to-Interference-plus-Noise Ratio |
| SLA | Slice Service Level Agreements |
| SMF | Session Management Function |
| S-NSSAI | Single Network Slice Selection Assistance Information |
| SUPI | Subscription Permanent Identifier |
| TA | Tracking Area |
| TAI | Tracking Area Identity |
| TS | Technical Specification |
| UCU | User Configuration Update |

-continued

| UDM | Unified Data Management |
| --- | --- |
| UDR | Unified Data Repository |
| UE | User Equipment |
| UPF | User Plane Function |
| URI | Uniform Resource Identifier |

The following description of examples of the disclosure, with reference to the accompanying drawings, is provided to assist in a comprehensive understanding of the disclosure, as defined by the claims. The description includes various specific details to assist in that understanding. Accordingly, those of ordinary skill in the art will recognize that various changes and modifications of the examples described herein can be made without departing from the scope of the disclosure.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the disclosure.

The terms and words used herein are not limited to the bibliographical or standard meanings, but, are merely used to enable a clear and consistent understanding of the disclosure.

Throughout the description and claims of this specification, the words "comprise", "include" and "contain" and variations of the words, for example "comprising" and "comprises", means "including but not limited to", and is not intended to (and does not) exclude other features, elements, components, integers, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, or activity and X is some means for carrying out that action, process, operation, function, or activity) encompasses means X adapted, configured or arranged specifically, but not necessarily exclusively, to do Y.

Features, elements, components, integers, processes, operations, functions, characteristics, properties and/or groups thereof described or disclosed in conjunction with a particular aspect, embodiment of the disclosure, example or claim of the disclosure are to be understood to be applicable to any other aspect, embodiment of the disclosure, example or claim described herein unless incompatible therewith.

Certain examples of the disclosure provide methods, apparatus and systems for determining analytics for service experience for a Network Slice instance in a network. For example, certain examples of the disclosure provide methods, apparatus and systems for performing management of QoE in a network. For example, certain examples of the disclosure provide methods, apparatus and systems for management of NSI-level QoE in 3GPP 5GC using NWDAF data analytics. However, the skilled person will appreciate that the disclosure is not limited to these examples, and may be applied in any suitable system or standard, for example one or more existing and/or future generation wireless communication systems or standards, including any existing or future releases of the same standards specification, for example 3GPP 5GC.

It will be appreciated that examples of the disclosure may be realized in the form of hardware, software or a combination of hardware and software. Any such software may be stored in the form of volatile or non-volatile storage, for example a storage device like a read only memory (ROM), whether erasable or rewritable or not, or in the form of memory, such as, for example, random access memory (RAM), memory chips, device or integrated circuits or on an optically or magnetically readable medium, such as, for example, a compact disc (CD), digital versatile disc (DVD), magnetic disk or magnetic tape or the like. Certain examples of the disclosure may provide a computer program comprising instructions or code which, when executed, implement a method, system and/or apparatus in accordance with any aspect, claim, example and/or embodiment disclosed herein. Certain examples of the disclosure provide a machine-readable storage storing such a program.

In 3GPP 5GS, the following are defined (e.g., in 3GPP TS 23.501). A network slice (NS) is defined as a logical network that provides specific network capabilities and network characteristics. A network slice instance (NSI) is defined as a set of Network Function instances and the required resources (e.g., compute, storage and networking resources) which form a deployed NS. A network function (NF) is defined as a 3GPP adopted or 3GPP defined processing function in a network, which has defined functional behavior and 3GPP defined interfaces. NFs in 3GPP 5GC include a network data analytics function (NWDAF) (as defined in 3GPP TS 23.288) and a network slice selection function (NSSF).

The NSSF supports functionality including selecting the set of NSIs serving a UE. The NWDAF provides load level information to an NF on a network slice instance level. The NWDAF notifies slice specific network status analytics information to the NFs that are subscribed to it. An NF may collect directly slice specific network status analytics information from NWDAF. NSSF may be a consumer of network analytics provided by NWDAF. NSSF may use the load level information provided by NWDAF for slice selection.

A key issue in the 3GPP SA2 enablers for network automation (eNA) work items (both in Rel-16 and Rel-17), is how to guarantee slice service level agreements (SLAs). Hence, it is currently under study in the standardization working group how NWDAF and the different analytics it provides could assist in the task of guaranteeing a slice's SLA previously agreed between tenant and operator.

In Rel-16 SA2 has specified two types of analytics at slice level, namely i) slice load and ii) slice quality of experience (QoE) analytics. These analytics may allow the triggering of control plane mechanisms at slice level. In Rel-16 a single network slice selection assistance information (S-NSSAI) ("slice") may be implemented in a network by more than one NSI. As the current specification stands, there is currently no control plane mechanism enabled allowing to determine the QoE of an NSI and perform any action at such NSI level, as current control plane mechanisms only consider NF and S-NSSAI levels.

The above information is presented as background information only to assist with an understanding of the disclosure. No determination has been made, and no assertion is made, as to whether any of the above might be applicable as prior art with regard to the disclosure.

The following examples are applicable to, and use terminology associated with, 3GPP 5GS. However, the skilled person will appreciate that the techniques disclosed herein are not limited to 3GPP 5GS. For example, the functionality of the various network entities disclosed herein may be applied to corresponding or equivalent entities in other communication systems or standards. Corresponding or equivalent entities may be regarded as entities that perform the same or similar role within the network. For example, the functionality of the NWDAF in the examples below may be applied to any other suitable type of entity providing network analytics, the functionality of the NSSF in the examples below may be applied to any other suitable type of entity performing a network slice selection function, the functionality of the AMF in the examples below may be applied to any other suitable type of entity performing mobility management functions, the functionality of the SMF in the examples below may be applied to any other suitable type of entity performing a session management function, and the functionality of the AF in the examples below may be applied to any other suitable type of entity performing application functions. The skilled person will also appreciate that the transmission of information between network entities is not limited to the specific form or type of messages described in relation to the examples disclosed herein.

In the following, a network slice (NS) may be defined as a logical network that provides specific network capabilities and network characteristics, a network slice instance (NSI) may be defined as a set of Network Function instances and the required resources (e.g., compute, storage and networking resources) which form a deployed Network Slice, an NSI ID may be defined as an identifier for identifying the Core Network part of a Network Slice instance when multiple Network Slice instances of the same Network Slice are deployed, and there is a need to differentiate between them in the 5GC.

Network slices may differ for supported features and network functions optimizations, in which case such Network Slices may have e.g., different S-NSSAIs with different Slice/Service Types. The operator can deploy multiple Network Slices delivering exactly the same features but for different groups of UEs, e.g., as they deliver a different committed service and/or because they are dedicated to a customer, in which case such Network Slices may have e.g., different S-NSSAIs with the same Slice/Service Type but different Slice Differentiators.

The network may serve a single UE with one or more Network Slice instances simultaneously via a 5G-AN regardless of the access type(s) over which the UE is registered (i.e., 3GPP Access and/or N3GPP Access). The AMF instance serving the UE logically belongs to each of the Network Slice instances serving the UE, i.e., this AMF instance is common to the Network Slice instances serving a UE.

The selection of the set of Network Slice instances for a UE is triggered by the first contacted AMF in a Registration procedure normally by interacting with the NSSF, and can lead to a change of AMF.

In the following, a protocol data unit (PDU) Connectivity Service may be defined as a service that provides exchange of PDUs between a UE and a Data Network, a PDU Session may be defined as an association between the UE and a Data Network that provides a PDU connectivity service.

A PDU Session belongs to one and only one specific Network Slice instance per PLMN. Different Network Slice instances do not share a PDU Session, though different Network Slice instances may have slice-specific PDU Sessions using the same DNN.

The set of Network Slices for a UE can be changed at any time while the UE is registered with a network, and may be initiated by the network, or by the UE, under certain conditions as described below.

The network, based on local policies, subscription changes and/or UE mobility, operational reasons (e.g., a Network Slice instance is no longer available or load level information for a network slice instance provided by the NWDAF), may change the set of Network Slice(s) to which the UE is registered and provide the UE with a new Registration Area and/or Allowed NSSAI and the mapping of this Allowed NSSAI to HPLMN S-NSSAIs, for each Access Type over which the UE is registered.

In the following examples, a network may include a user equipment (UE), an access and mobility management function (AMF) entity, a network slice selection function (NSSF) entity, a network data analytics function (NWDAF) entity, a session management function (SMF) entity, an application function (AF) entity, and one or more other network function (NF) entities.

A particular network function can be implemented either as a network element on a dedicated hardware, as a software instance running on a dedicated hardware, or as a virtualized function instantiated on an appropriate platform, e.g., on a cloud infrastructure. A NF service may be defined as a functionality exposed by a NF through a service based interface and consumed by other authorized NFs.

NWDAF represents operator managed network analytics logical function providing slice specific network data analytics to a NF. Stage 2 architecture enhancements for 5GS to support network data analytics services in 5GC are defined in 3GPP TS 23.288 (e.g., V 16.0.0). The NWDAF is part of the architecture specified in 3GPP TS 23.501 (e.g., V 15.6.0).

The NWDAF services are used to expose load level analytics from the NWDAF to the consumer NF (e.g., NSSF). Analytics may be filtered by (i) Network Slice Instance, (ii) Load Level Threshold value the NWDAF reports when the load level crosses the threshold provided in the analytics subscription, if no threshold is provided in the subscription, the reporting (Notify operation) is assumed to be periodic.

The NWDAF provides load level information to an NF on a network slice instance level. The NWDAF is not required to be aware of the current subscribers using the slice. The NWDAF notifies slice specific network status analytics information to the NFs that are subscribed to it. An NF may collect directly slice specific network status analytics information from NWDAF. This information is not subscriber specific.

The 5GC AMF receives all connection and session related information from the UE (N1/N2) but is responsible only for handling connection and mobility management tasks. All messages related to session management are forwarded over the N11 reference interface to the SMF. The AMF performs the role of access point to the 5GC. The functional description of AMF is given in 3GPP TS 23.501 clause 6.2.1.

The functional description of NSSF is given in 3GPP TS 23.501 clause 6.2.14. NSSF supports the following functionality (i) Selecting the set of Network Slice instances serving the UE, (ii) Determining the Allowed NSSAI and, if needed, the mapping to the Subscribed S-NSSAIs, (iii) Determining the Configured NSSAI and, if needed, the mapping to the Subscribed S-NSSAIs, (iv) Determining the AMF Set to be used to serve the UE, or, based on configuration, a list of candidate AMF(s), possibly by querying the NRF.

The functional description of SMF is given in 3GPP TS 23.501 clause 6.2.2. SMF includes functionality including Session Management e.g., Session Establishment, modify and release, including tunnel maintain between UPF and AN node.

The functional description of AF is given in 3GPP TS 23.501 clause 6.2.10. The Application Function (AF) interacts with the 3GPP Core Network in order to provide services, for example to support the following: (i) Application influence on traffic routing, (ii) Accessing Network Exposure Function, (iii) Interacting with the Policy framework for policy control.

A key issue in the 3GPP SA2 enablers for network automation (eNA) work items (both in Rel-16 and Rel-17) is how to guarantee slice service level agreements (SLAs). Hence, it is currently under study in the standardization working group how NWDAF and the different analytics it provides could assist in the task of guaranteeing a slice's SLA previously agreed between tenant and operator. The solutions to this problem may need to be constrained to control plane based mechanisms, hence in certain examples of the disclosure no operations administration and maintenance (OAM) specific mechanism may be implemented.

FIG. 1 illustrates a composition of an S-NSSAI according to an embodiment of the disclosure.

Referring to FIG. 1, as control plane based mechanisms dealing with slices, there are three related concepts that can be considered as defined in 3GPP TS 23.501 "System Architecture for the 5G System, Stage 2", v16.1.0, namely Network Slice (identified by an S-NSSAI in 3GPP specifications), network slice instance (identified by an NSI ID in 3GPP specifications that is currently optional), and network function (NF). They are hierarchically related, as shown in FIG. 1. In certain examples of the disclosure, for the purposes of this discussion the new 3GPP concepts of NF Set and NF Service set may be ignored, as an NF Set can be seen as an NF instance, and an NF Service Set is part of an NF instance. An NF Set contains multiple NF instances of the same type that share (or can transfer) context data, and are interchangeable, so can be treated as equivalent to an NF instance. In certain examples of the disclosure, the service communications proxy (SCP) may also be ignored in the context of this discussion.

In Rel-16 SA2 has specified two types of analytics at slice level, namely i) slice load and ii) slice quality of experience (QoE) analytics. These analytics may allow the triggering of control plane mechanisms at slice level.

Slice load: Slice load level data analytics as described in 3GPP TS 23.288 "Architecture enhancements for 5G System (5GS) to support network data analytics services", v16.1.0 refer to NSI level and are provided in two possible formats, i) when a load threshold is provided as analytic filter by the consumer NF in the slice load subscription message, NWDAF informs the consumer NF of such threshold crossings each time they happen, and ii) when no load threshold is provided by the consumer NF, NWDAF provides periodic notifications to the consumer NF reporting the NSI load. The specification lacks details on how slice load is calculated and reported (e.g., in the absence of a threshold), how input data is gathered by NWDAF, and how statistics and predictions on load would be obtained and reported.

Slice QoE, Slice QoE analytics as described in 3GPP TS 23.288 "Architecture enhancements for 5G System (5GS) to support network data analytics services", v16.1.0 refer to S-NSSAI level and are derived using observed service experience analytics provided for UEs/applications on such S-NSSAI. The mean opinion score (MOS) values used for service experience are obtained from the corresponding application function (AF), and other relevant network data is obtained from different 5GC NFs. However, the specification currently lacks details on how the input data gathering by the NWDAF is performed on other 5GC NFs as the NF's Event IDs that should allow such network data to be delivered to NWDAF are often missing from the specification.

Examples of the disclosure relate to the field of data analytics for network automation. Building on the existing framework, examples of the disclosure provide mechanisms that allow slice QoE metrics at NSI level to be determined and/or predicted at the 5GC, therefore enabling subsequent NSI-level control plane mechanisms to be triggered to assist with the slice SLA guarantee process. An example of such NSI-based control plane mechanism is slice load (re)distribution. Leveraging on NSI level QoE metrics, the network could trigger a redistribution of the load among NSIs in case e.g., one of the NSIs is malfunctioning and the network detects it via the proposed mechanisms in this disclosure. Furthermore, if the load is distributed unevenly among NSIs (e.g., for power efficiency reasons) and the network detects, via NSI level QoE mechanisms according to examples of the disclosure, that no SLA degradation issue is happening or predicted to happen, then such an uneven distribution of load could be kept. Conversely, if such an SLA degradation is indeed happening or predicted to happen over one particular NSI, then the network could trigger NSI-based load redistribution.

Accordingly, examples of the disclosure address the problem of the control plane determining and/or predicting the QoE of an NSI that is part of an S-NSSAI using the available NWDAF analytics so that other NSI level mechanisms can be triggered to guarantee slice SLA. Specification of how the QoE of a Network Slice/Network Slice Instance is determined by the control plane and provided as analytics is absent in Rel-16. Furthermore, the NWDAF specification in 3GPP TS 23.288 "Architecture enhancements for 5G System (5GS) to support network data analytics services", v16.1.0 does not account for the case of an S-NSSAI ("slice") being implemented in a network by more than one NSIs. For single-NSI S-NSSAI, the specification supports the possibility of providing slice service experience for one specific S-NSSAI. However, if the S-NSAAI is composed of several NSIs, there is currently no way to determine and/or predict the NSI's QoE.

There are a number of reasons why an operator may be interested in having more than one NSI per S-NSSAI. Among others, the following reasons can be highlighted in this context:

An NSI per data center, for resilience purposes.
An NSI per geographic region, to manage delay times and also increase resilience.
An NSI per vendor, to minimize inter-vendor interworking.
Multiple NSIs to contain the impact of serious network malfunction (reduce the chance of a malfunction in one part of the next spreading to others).
Multiple NSIs to control rollout of new software/equipment.

In certain examples of the disclosure, even if multiple NSIs logically exist, not all of them need to be operating. An additional NSI may be instantiated when it is needed by the network, and similarly, an NSI may be de-instantiated at some point if decided by the network due to e.g., power consumption reasons. The de-instantiation of an NSI requires its remaining load to be re-distributed to another NSI before the de-instantiation itself is performed.

Assuming an S-NSSAI is composed of more than one NSI, the NSI QoE needs to be taken into account when the NSI allocation takes place, which is decided by the AMF and NSSF as specified in 3GPP TS 23.501 "System Architecture for the 5G System, Stage 2", v16.1.0. The NSI to be used for a UE for an S-NSSAI can be chosen at the time of UE registration, or can be decided when a PDU session is established. In the latter case a different NSI could in principle be used for each PDU session establishment, or an NSI could be chosen for future sessions (and this NSI could replace the one chosen at UE registration). Whether new PDU session requests would change the NSI which they are allocated to, or existing PDU sessions can be steered away to a different NSI, it would all happen triggered by an NSI-level QoE determination Certain examples of the disclosure address the problem of how to determine and/or predict the QoE of an NSI that is part of an S-NSSAI using the available NWDAF analytics.

The skilled person will appreciate that the disclosure is not limited to the specific examples disclosed herein. For example, the techniques disclosed herein are not limited to 3GPP 5G. One or more entities in the examples disclosed herein may be replaced with one or more alternative entities performing equivalent or corresponding functions, processes or operations. One or more of the messages in the examples disclosed herein may be replaced with one or more alternative messages, signals or other type of information carriers that communicate equivalent or corresponding information. The skilled person will appreciate that one or more further elements or entities may be added to the examples disclosed herein. The skilled person will also appreciate that one or more non-essential elements or entities may be omitted in certain examples. For example, one or more of the message indicated with dotted arrows illustrated in the FIGS. 6 and 8 may be omitted in certain examples. The functions, processes or operations of a particular entity in one example may be divided between two or more separate entities in an alternative example. The functions, processes or operations of two or more separate entities in one example may be performed by a single entity in an alternative example. Information carried by a particular message in one example may be carried by two or more separate messages in an alternative example. The information carried by two or more separate messages in one example may be carried by a single message in an alternative example. The order in which operations are performed and/or the order in which messages are transmitted may be modified, if possible, in alternative examples.

The skilled person will appreciate that various examples of the disclosure provide a technique (e.g., method, apparatus, system, and the like) for determining analytics for service experience for a Network Slice instance. One example of such analytics is analytics relating to quality of service (QoS). For example, the analytics may include statistics and/or predictions for a Network Slice instance QoE. However, the skilled person will appreciate that analytics in examples of the disclosure are not limited to QoE or these specific examples. One example of QoS is mean opinion score (MOS), although the skilled person will appreciate that QoS in examples of the disclosure is not limited to this specific example.

Certain examples of the disclosure involve information for determining (or identifying, recognizing, discovering, and the like) a mapping between a set of one or more UEs and a set of one or more Network Slice instances. The skilled person will appreciate that, in certain examples, such mapping may refer to allocation information of each UE to a corresponding Network Slice instance, although examples of the disclosure are not limited to this specific definition. The mapping may be defined in a direct or indirect manner. The mapping may be defined in an explicit or implicit manner.

Throughout the disclosure, a "Network Slice instance" or "Network Slice Instance" may be defined as a set of Network Function instances and the required resources (e.g., compute, storage and networking resources) which form a deployed Network Slice. The terms "Network Slice instance" and "Network Slice Instance" are used interchangeably in the disclosure, and both may be referred to by the acronym "NSI".

In certain examples of the disclosure, a first entity may request information from a second entity. The skilled person will appreciate that such a request may be made according to any suitable scheme. For example, a request may be a "one-off" request in which the second entity provides the requested information one time for each separate request made by the first entity. A request may include be a request to subscribe to information, such that the second entity provides the requested information multiple times to the first entity in response to a single request (subscription request). Once the subscription is established, the second entity may provide the requested information to the first entity according to any suitable scheme, for example periodically, or whenever one or more predefined criteria are satisfied.

Examples of the disclosure allow control plane to be able to determine and/or predict and act upon NSI QoE by using mechanisms available at the 5GC NFs. Examples of the disclosure do not require OAM mechanisms to aid in such operations, as legacy networks (i.e., 3G, 4G, and Rel-15 5G) currently do. References herein to determining NSI QoE also include references to predicting NSI QoE.

Certain examples of the disclosure provide control plane mechanisms to guarantee slice SLA aided by data analytics, i.e., by NWDAF in 5GC, leveraging the introduction of NWDAF in the 5GC during Rel-16 and the support of slice level analytics. A slice as represented by an S-NSSAI in the 5GC in Rel-16 5G is composed of different NSIs. Examples of the disclosure address the problem of determining and/or predicting the QoE of the individual NSIs that form an S-NSSAI as a critical way to allow performing NSI-level control plane mechanisms that mitigate any slice QoE problem that may reach the S-NSSAI level.

As the current specification stands, there is currently no control plane mechanism enabled allowing to determine and/or predict the QoE of an NSI and perform any action at such NSI level, as current control plane mechanisms only consider NF and S-NSSAI levels. One obstacle is the current impossibility to have an entity (i.e., a 5GC NF) with information on both the UEs allocated to a specific NSI and their service experience values, so that an NSI-wide QoE metric can be derived and reacted upon. Examples of the disclosure clarify the following with respect to the task of obtaining/deriving NSI level QoE information:

Identify the most convenient NF to obtain the required data and/or derive the NSI-wide QoE metric.

Develop a procedure centered on the identified NF implementing such task.

One option with relatively low technical complexity to address the problem above would be to allow NSSF to store UE level data whenever a registration procedure is performed. This solution would be technically simple, but current directions of 5GC NF specifications make unlikely such a solution to be enabled. Nevertheless, the following Alternative 1-0 is provided to account for this possibility:

Alternative 1-0: NSSF receives SUPI with registration request from AMF so, NSSF would decide the NSI ID aware of the SUPI to which such NSSI-ID is allocated. In this case no new procedure is required to enable NSSF to derive NSI level QoE using currently specified NWDAF analytics in 3GPP TS 23.288 "Architecture enhancements for 5G System (5GS) to support network data analytics services", v16.1.0.

Since the specifications evolve over time, there could be multiple ways in which NSI level QoE could be determined and/or predicted, as well as many NSI level procedures that could be triggered upon leveraging the former metric. Certain examples of the disclosure identify NSSF in particular as a possible entity for the NSI QoE determination and/or prediction task (Alternatives 1-1 to 1-3), while certain other examples of the disclosure identify NWDAF as a possible entity for perform such a role (Alternatives 2-1-1 to 2-1-3 and 2-2). However, both NSSF and NWDAF currently lack the information mentioned above to execute the task. In that regard, the following proposals are disclosed, which differ in the procedures they require in the specification and the network cost that needs to be paid for the information to be available:

Alternative 1-1: Requires a new service on the AMF that allows an NF (the NSSF) to ask which UE's have sessions on which NSIs. It requires the AMF to be informed of the NSI ID being used for a PDU session.

Alternative 1-2: Requires a new Event ID for the Namf_EventExposure service that allows an NSSF to be informed when PDU sessions are established in a particular NSI. The event notifications include the SUPI of the UE. It requires the AMF to be informed of the NSI ID being used for a PDU session.

Alternative 1-3: A new service is introduced on the SMF that allows the NSSF to ask for a list of UEs with active PDU sessions and their corresponding NSI IDs.

In addition, certain examples of the disclosure provide a second set of alternative solutions where the gathering of the NSI to UE mapping information happens at NWDAF instead of at NSSF. The required services are the same as in the alternatives listed above, but the consumer NF is NWDAF instead of NSSF. This set of alternatives effectively means that NWDAF can provide NSI level QoE analytics, so the information could be sent to NSSF either as a list of QoE values for all UEs on the NSI of interest or as a single aggregated value directly representing the NSI QoE.

Alternatives 2-1-1 to 2-1-3: These solutions centered around NWDAF are analog to the set of three alternative solutions (Alternatives 1-1 to 1-3) described above centered around the AMF, but with NWDAF assuming the role of AMF in gathering the required information and using it in the delivery of analytics. The QoE value(s) for the NSI(s) of interest are thus sent to NSSF.

Alternative 2-2: In this solution, NWDAF provides the mapping with the list of SUPIs and NSI IDs as part of the analytics output for an analytics type other than slice service experience (e.g., a slice load). NSSF then utilizes the mapping and the S-NSSAI service experience values to derive NSI QoE.

Alternative 2-3: In this solution, an analytics filter may be based on an Area of Interest and used to determine service experience statistics and predictions of an NSI ID or set of NSI IDs. The mapping of SUPIs (i.e., UE IDs) to an NSI ID may be performed at the NWDAF via a procedure for NWDAF data collection that leverages existing AMF event and event exposure services and newly proposed slice-related event filters. Also, a mapping of S-NSSAI, NSI ID(s) and Application(s) service experiences may be provided as output analytics. In certain examples, it may be assumed that the consumer of NWDAF analytics provides, as analytics filter, the NSI ID of interest in addition to the corresponding S-NSSAI.

The above Alternatives are described in greater detail further below with reference to FIGS. 3 to 10.

In addition, in certain examples of the disclosure, the task of determining and/or predicting NSI QoE at control plane could be also carried out by employing multiple instances of NSSF and/or NWDAF, and the skilled person will appreciate that the above Alternative solutions may be easily extended to account such scenario.

As mentioned earlier, while NWDAF providing NSI QoE analytics is not supported in the standard, Rel-16 specifications already describe the possibility of the NSSF subscribing to information from the NWDAF about the load level of a Network Slice Instance (NSI).

Figure 2:
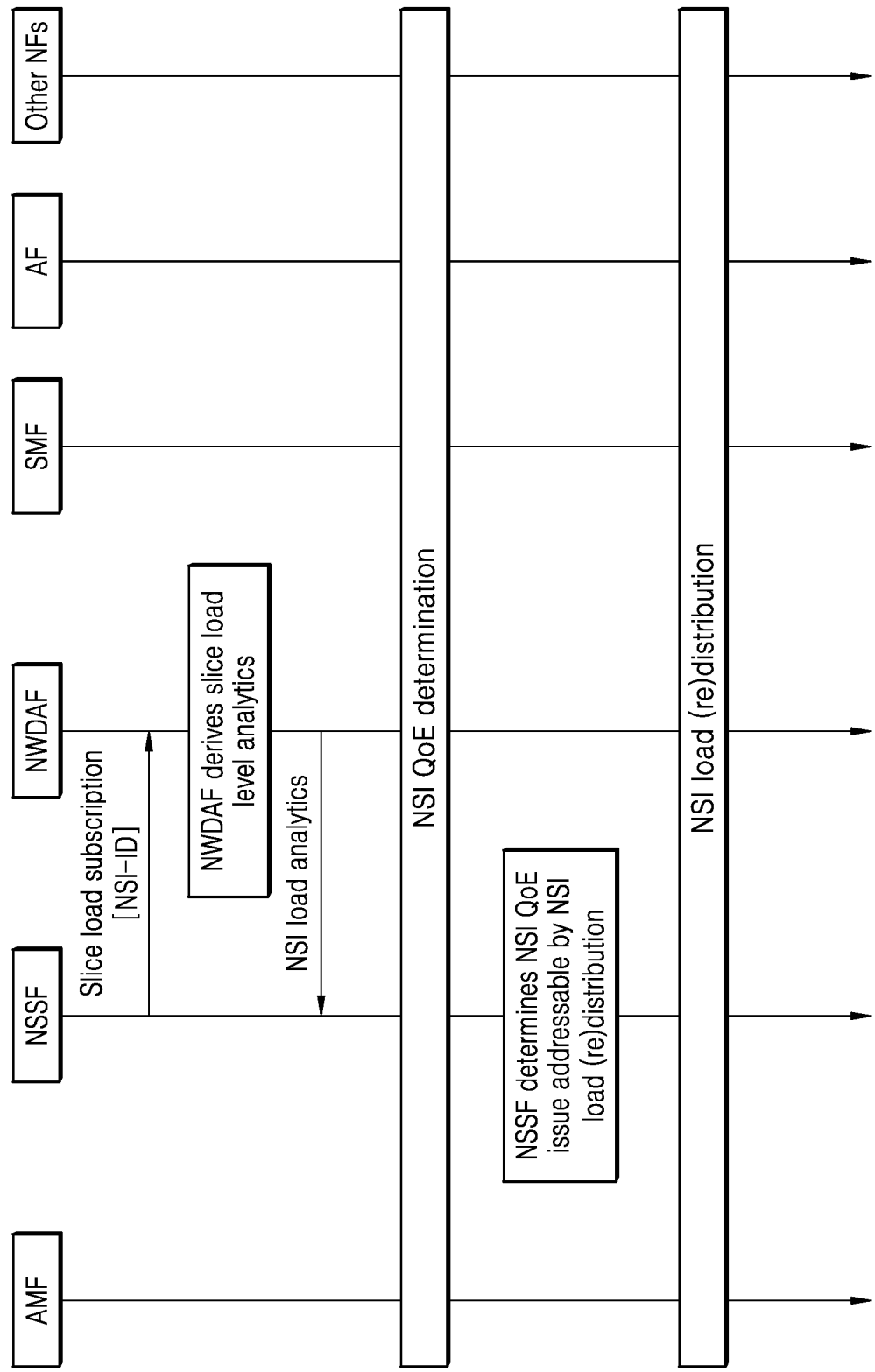
FIG. 2 illustrates a technique utilizing according to an embodiment of the disclosure.

FIG. 2 shows an example of how the techniques disclosed herein may be used according to an embodiment of the disclosure.

In this example, NSSF subscribes to slice level load analytics, where the analytics are provided for an NSI ID specified in the subscription. NWDAF derives the requested analytics and sends them to the NSSF. Upon reception of such analytics, the NSSF may not have enough information to determine whether NSI load redistribution is needed without having information on NSI level QoE. This may happen, for example, in cases of a malfunctioning NSI or an unevenly loaded system with several NSIs but no clear reason to start a load balancing process that may take signaling resources of the network. For these reasons, the NSSF may trigger a procedure to determine NSI QoE for the NSI ID for which it received load analytics. After the procedure is completed, and with NSI QoE information available in addition to NSI load analytics (which may include statistics about the past or predictions about the future), the network would be more informed to trigger an NSI level mechanism, which in this case could be a load redistribution procedure to offload a malfunctioning NSI that could deteriorate slice QoE performance at S-NSSAI level.

Referring to FIG. 2, as part of the NSI QoS determination process, the NSSF can subscribe to MOS statistic notifications from the NWDAF. For that, NSSF invokes Nnwdaf_AnalyticsSubscription_Subscribe, with App ID, S-NSSAI, Analytic ID=SE, and DNN as input parameters. This effectively triggers the NWDAF to invoke Naf_EventExposure_Subscribe with App ID, Service Experience, Target of subscription=Any UE as input parameters. NWDAF should also invoke Nnf_EventExposure_Subscribe (where 'nf' is replaces any 5GC NF with relevant information for input data gathering at the NWDAF). The targeted 5GC NF is assumed to contain an Event ID that allows that information to be delivered to NWDAF whenever prompted and the input parameters of the event exposure subscription are provided according to the specifications of those relevant Event IDs. In addition, also as part of the NSI QoS determination functionality actions could be performed per NSI to try to discover if one of them is the cause of the service experience shortfall. For example, the NSSF could create a UE group from a randomly chosen set of UE's that it knows are using an NSI. It could then invoke Naf_EventExposure_Subscribe towards the AF with the random UE group as the target of the subscription. The NSSF could do this for each NSI, and use the outcome to determine if one of the NSIs is the source of the problem. In any case, NSSF should find out which UE's are using which NSI's, a process that is described in the different alternatives presented below.

FIG. 2 illustrates a technique utilizing according to an embodiment of the disclosure Referring to FIG. 2, an example of the actions that could be taken by the network following the determination of NSI QoE illustrated. If the estimated service experience is not acceptable (or if the trend of the service experience is towards not being acceptable) then some actions may be needed. For example, the NSSF could learn based on past measurements whether exceeding a load level in any of the NSIs can cause service experience issues, and could direct future PDU sessions to different NSIs. In fact, it should already be doing this to avoid a crossing a 'universal' threshold, but NSI-specific QoE and load history-based correlations could be exploited at NSSF to optimize performance with load distribution decisions.

The various Alternatives described above, to gather the required information so that a 5GC NF (e.g., NSSF) can derive NSI QoE metrics, will now be described in more detail with reference to FIGS. 3 to 7.

Alternative 1-0

As discussed above, this solution assumes that, during registration, the SUPI of the UE is shared with NSSF, so NSSF would already store the SUPI and NSI ID mapping when the NSI is selected. In that case, the service experience analytics (MOS) provided separately by NWDAF along with the SUPIs are already sufficient for NSSF to determine NSI QoE.

Alternative 1-1

Figure 3:
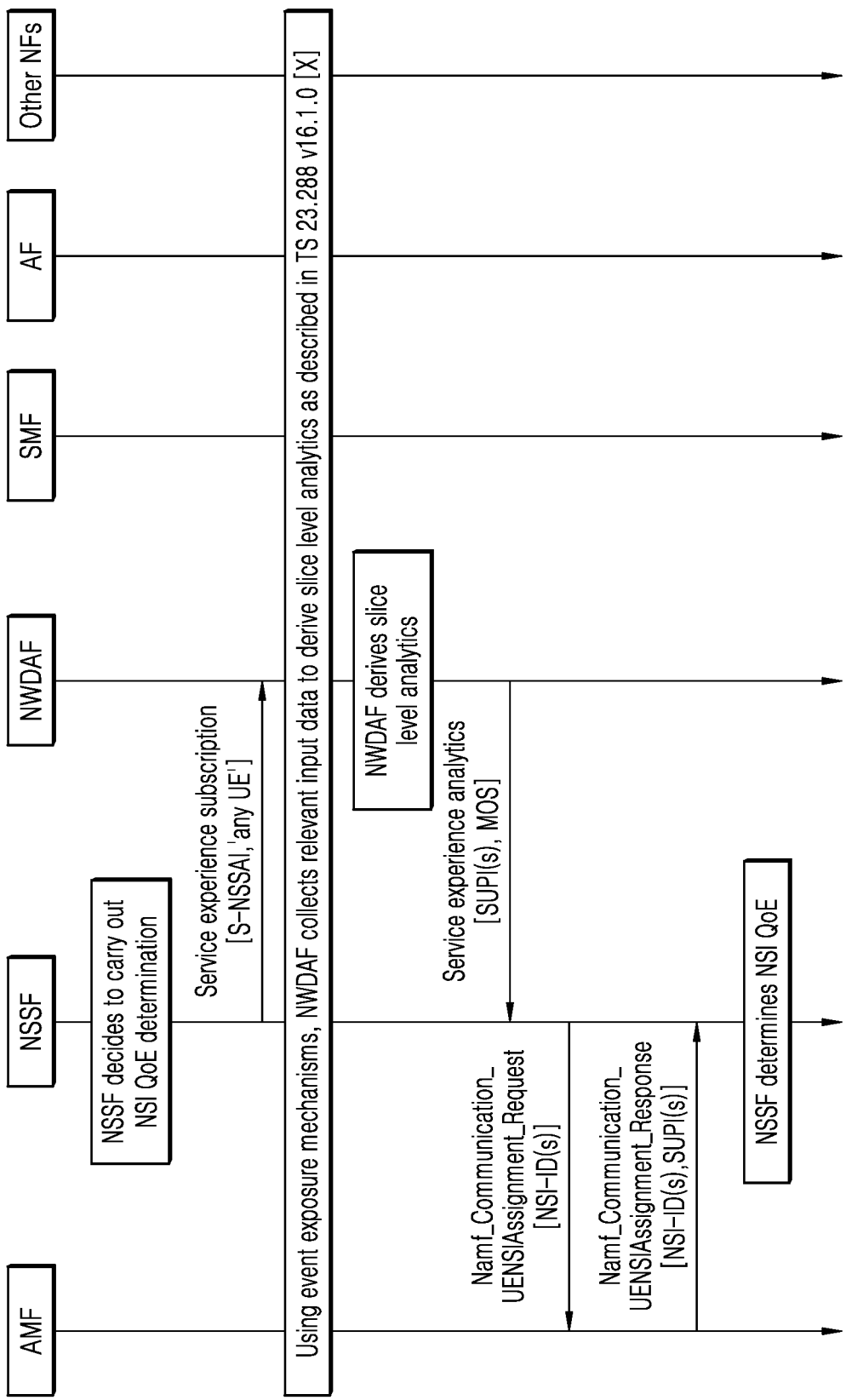
FIG. 3 illustrates a call flow for alternative 1-1 according to an embodiment of the disclosure.

FIG. 3 illustrates a call flow for alternative 1-1 according to an embodiment of the disclosure.

Referring to FIG. 3, a new AMF service is defined where AMF can provide the list of SUPIs allocated to certain NSI ID(s). The service is 'Namf_Communication_UENSIAssignment'. Hence, the way in which this solution can be applied is for NSSF to first subscribe to slice service experience analytics, indicating 'any UE' in the request. When the list of service experience values for all UEs in the S-NSSAI is received, NSSF requests the SUPI list to AMF in the NSI of interest, and when that information is received, the NSSF is capable of determining the QoE of the NSI by aggregating the selected service experience values from UEs on the NSI.

Namf_Communication_UENSIAssignment Service

Service description: This service enables the AMF to provide information on the UEs that have been assigned to certain NSI ID.

Service operation name: Namf_Communication_UENSIAssignment_Request

Description: This service operation enables a NF Service Consumer (e.g., NSSF) to request the list of SUPIs which had been allocated to one or a set of NSI IDs.

Inputs, Required: NSI ID of the NSI of interest.

Inputs, Optional: None.

Outputs, Required: None.

Outputs, Optional: None.

Service operation name: Namf_Communication_UENSIAssignment_Response

Description: This service operation enables the AMF to provide the NF Service Consumer (e.g., NSSF) with the SUPI list of UEs allocated to the NSI ID indicated in the request.

Inputs, Required: List of SUPI(s).
Inputs, Optional: NSI IDs (if multiple NSI ID(s) were indicated in the request).
Outputs, Required: None.
Outputs, Optional: None.

Alternative 1-2

Figure 4:
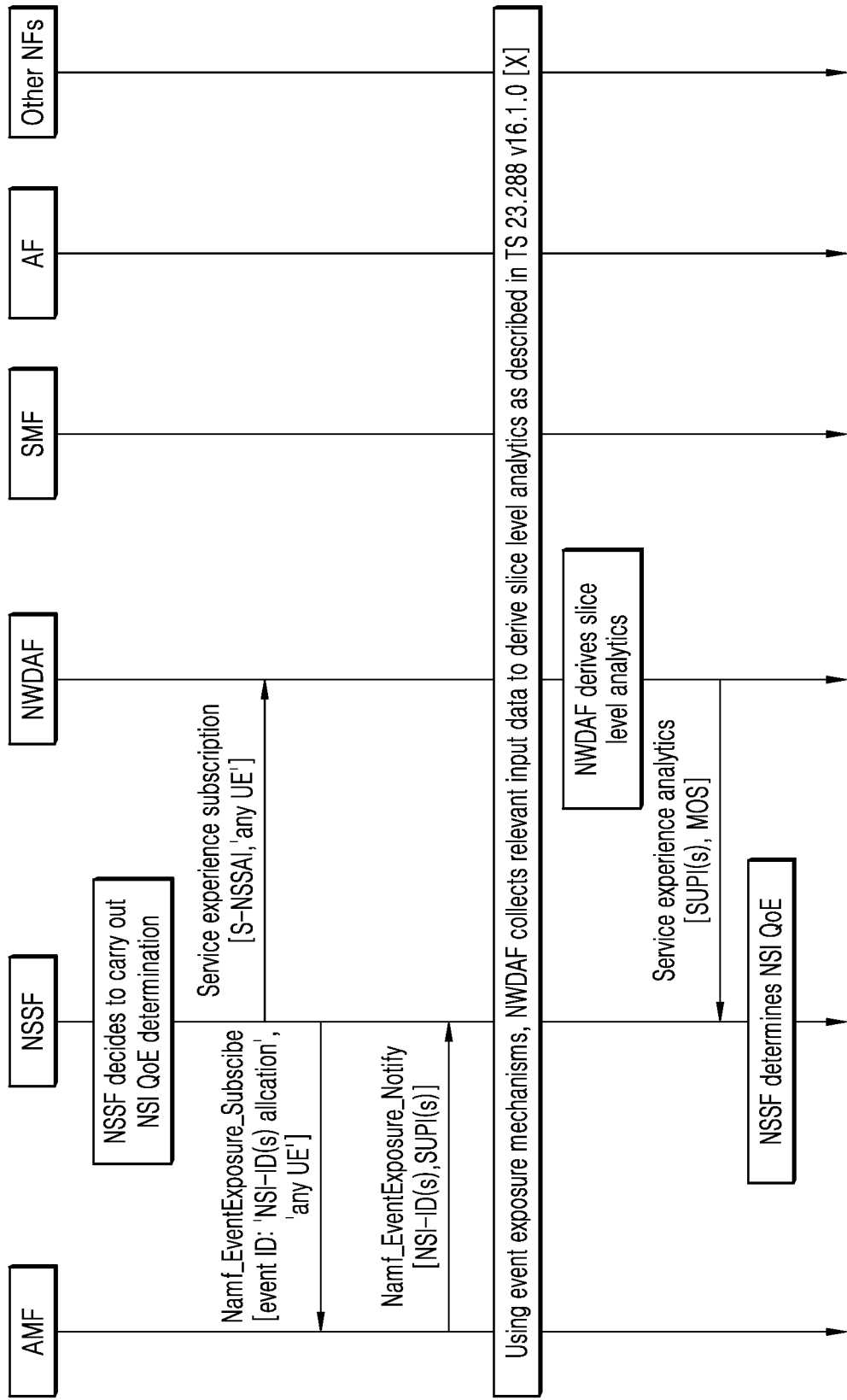
FIG. 4 illustrates a call flow for alternative 1-2 according to an embodiment of the disclosure.

FIG. 4 illustrates a call flow for alternative 1-2 according to an embodiment of the disclosure Referring to FIG. 4, a new Event ID is defined for AMF where a notification is sent whenever an NSI ID (or one NSI ID within a set of NSI IDs) is utilized for a new PDU session establishment. The new Event ID is 'NSI ID(s) allocation'. The consumer NF in this solution is NSSF, which subscribes to such notifications from AMF indicating the NSI ID(s) of interest and 'any UE' as target of the subscription. The NSI ID(s) are those for which a QoE determination is intended to be made, i.e., in the example shown in FIG. 4 they should correspond to the NSIs associated with S-NSSAI for which service experience analytics have been requested. For this new event ID an associated new Event Filter needs to be defined, namely the NSI ID for which the Event ID has been defined. The event exposure service at AMF could be utilized as it currently stands in 3GPP TS 23.502 "Procedures for the 5G System, Stage 2", v16.1.1 without further modifications.

Alternative 1-3

Figure 5:
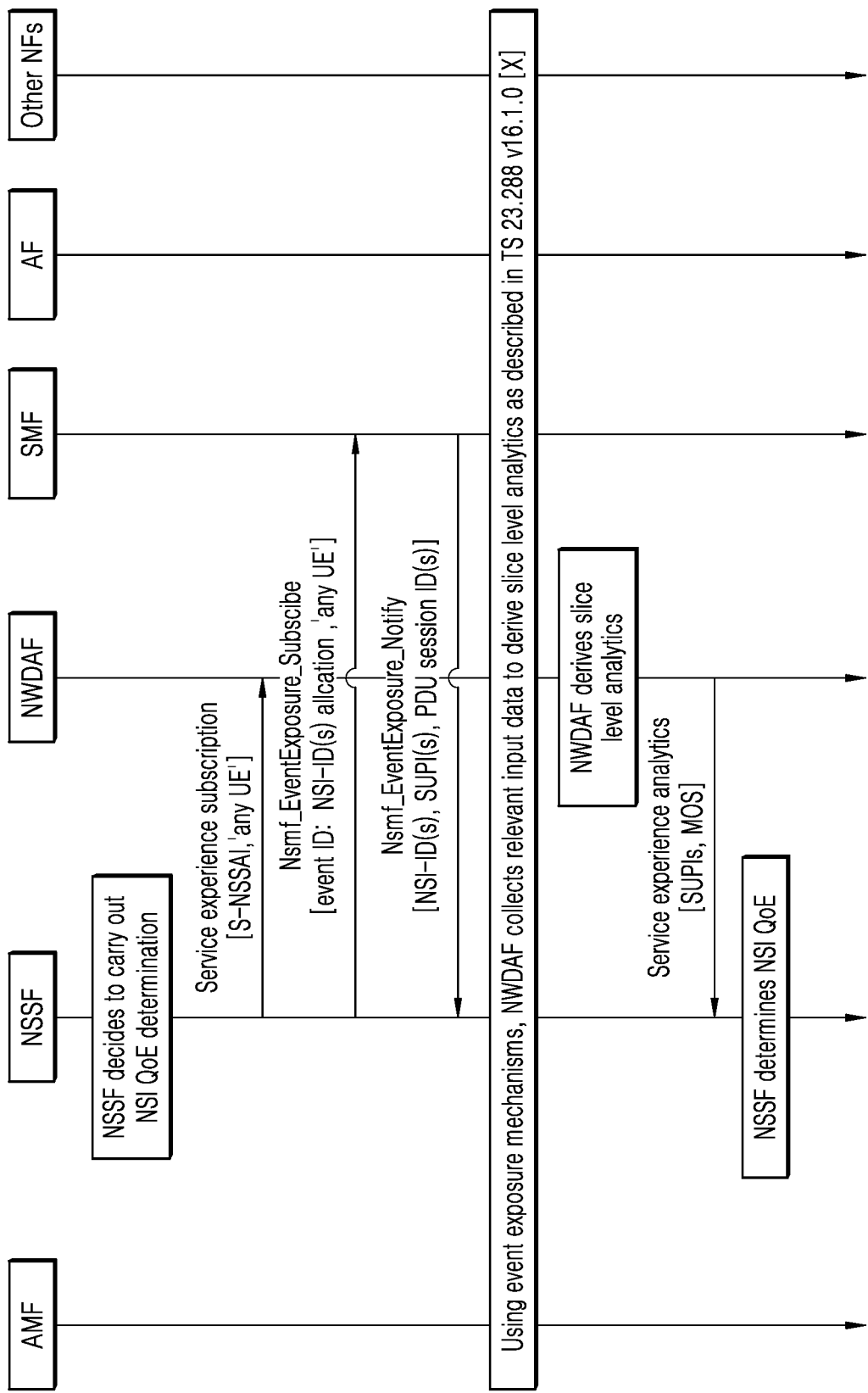
FIG. 5 illustrates a call flow for alternative 1-3 according to an embodiment of the disclosure.

FIG. 5 illustrates a call flow for alternative 1-3 according to an embodiment of the disclosure.

Referring to FIG. 5, Similarly to Solution 1-2, this Solution utilizes a new Event ID for event exposure, but the NF providing the service is SMF. A new Event ID needs to be created at SMF where every time an NSI ID allocation takes place, a notification is sent to the subscriber NF (NSSF in this case) with the NSI ID that has been allocated, the SUPI and the PDU session ID.

Alternative 2-1

Figure 6:
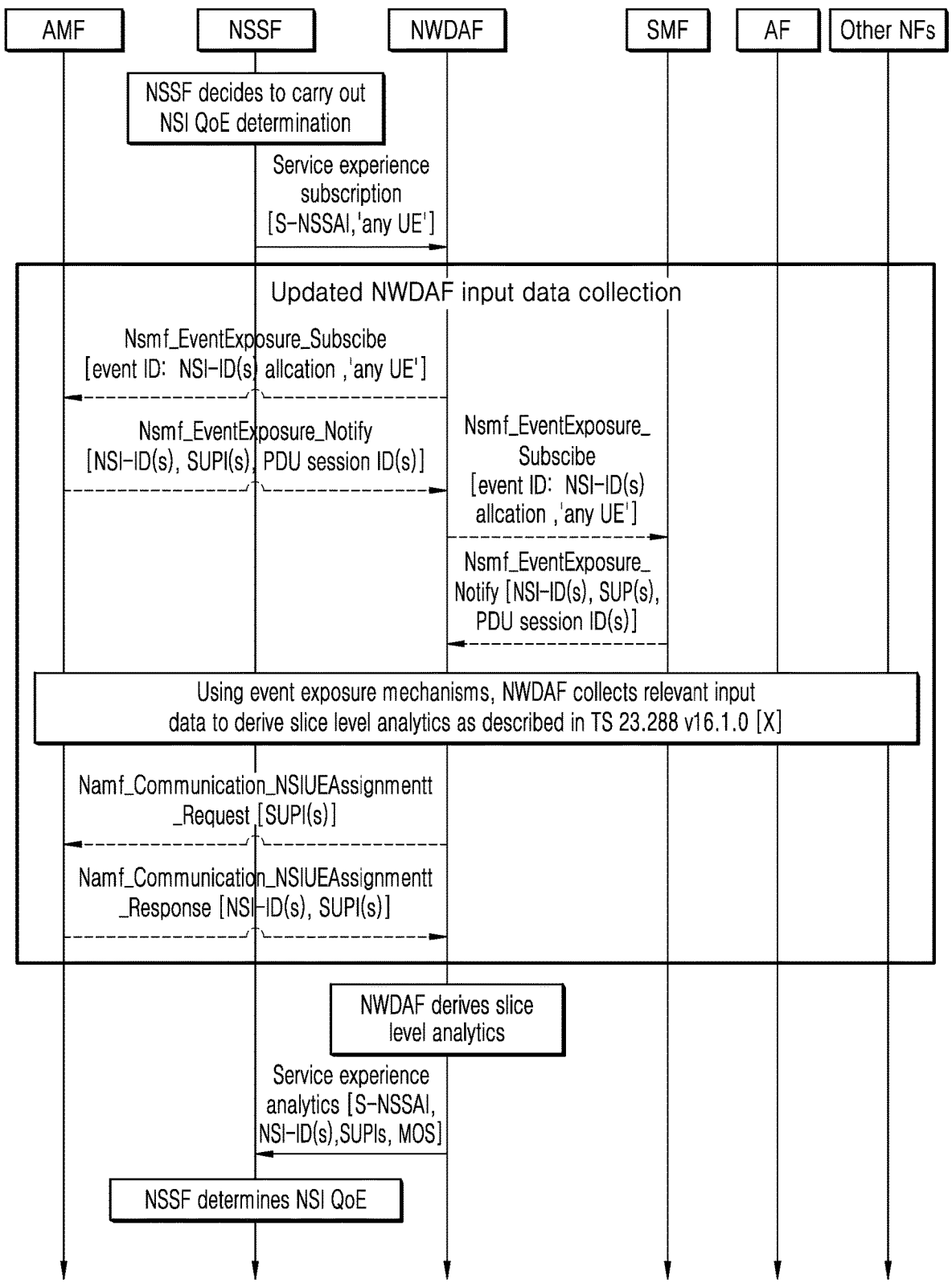
FIG. 6 illustrates call flows for alternatives 2-1-1, 2-1-2 and 2-1-3 according to an embodiment of the disclosure.

FIG. 6 illustrates call flows for alternatives 2-1-1, 2-1-2 and 2-1-3 according to an embodiment of the disclosure.

Referring to FIG. 6, this alternative leverages NWDAF input collection procedures to obtain the mapping of SUPIs to NSI IDs in a number of optional ways similar to the different alternatives mentioned above. The options include using one of the following services:

Namf_EventExposure service with a new Event ID defined for NSI ID allocation. The response message contains the NSI ID and the list of SUPIs allocated to such NSI ID.

Nsmf_EventExposure service with new Event ID defined for NSI ID allocation. The response contains the NSI ID, list of SUPIs, and PDU session IDs.

Namf_Communication_NSIUEAssignment service to request the NSI ID allocated to a list of SUPIs of interest. This is a new service currently not existing in the specification and its description can be found below.

Namf_Communication_NSIUEAssignment Service

Service description: This service enables the AMF to provide information to the NF Service Consumer on the NSI IDs that been allocated to a set of UEs.

Service operation name: Namf_Communication_UENSI-Assignment_Request

Description: This service operation enables a NF Service Consumer (e.g., NWDAF) to request AMF the NSI ID that has been allocated to a SUPI or set of SUPIs.

Inputs, Required: SUPI(s) of interest.
Inputs, Optional: None.
Outputs, Required: None.
Outputs, Optional: None.

Service operation name: Namf_Communication_UENSI-Assignment_Response

Description: This service operation enables the AMF to provide the NF Service Consumer (e.g., NWDAF) with the NSI IDs allocated to the UEs identified by their SUPI(s) in the service request.

Inputs, Required: NSI ID(s).
Inputs, Optional: SUPI(s) of interest.
Outputs, Required: None.
Outputs, Optional: None.

With the information on the SUPIs to NSI mapping available, NWDAF can provide a service experience output analytics where each SUPI is mapped to one NSI ID. Such information would then be easily utilized by NSSF to derive NSI-wide QoE values.

The skilled person will appreciate that FIG. 6 combines all three of the above services (corresponding to the three pairs of message exchange in the box illustrated in FIG. 6), whereas certain examples of the disclosure may include only one of these services (corresponding to one pair of message exchange) with the other two services omitted.

Alternative 2-2

Figure 7:
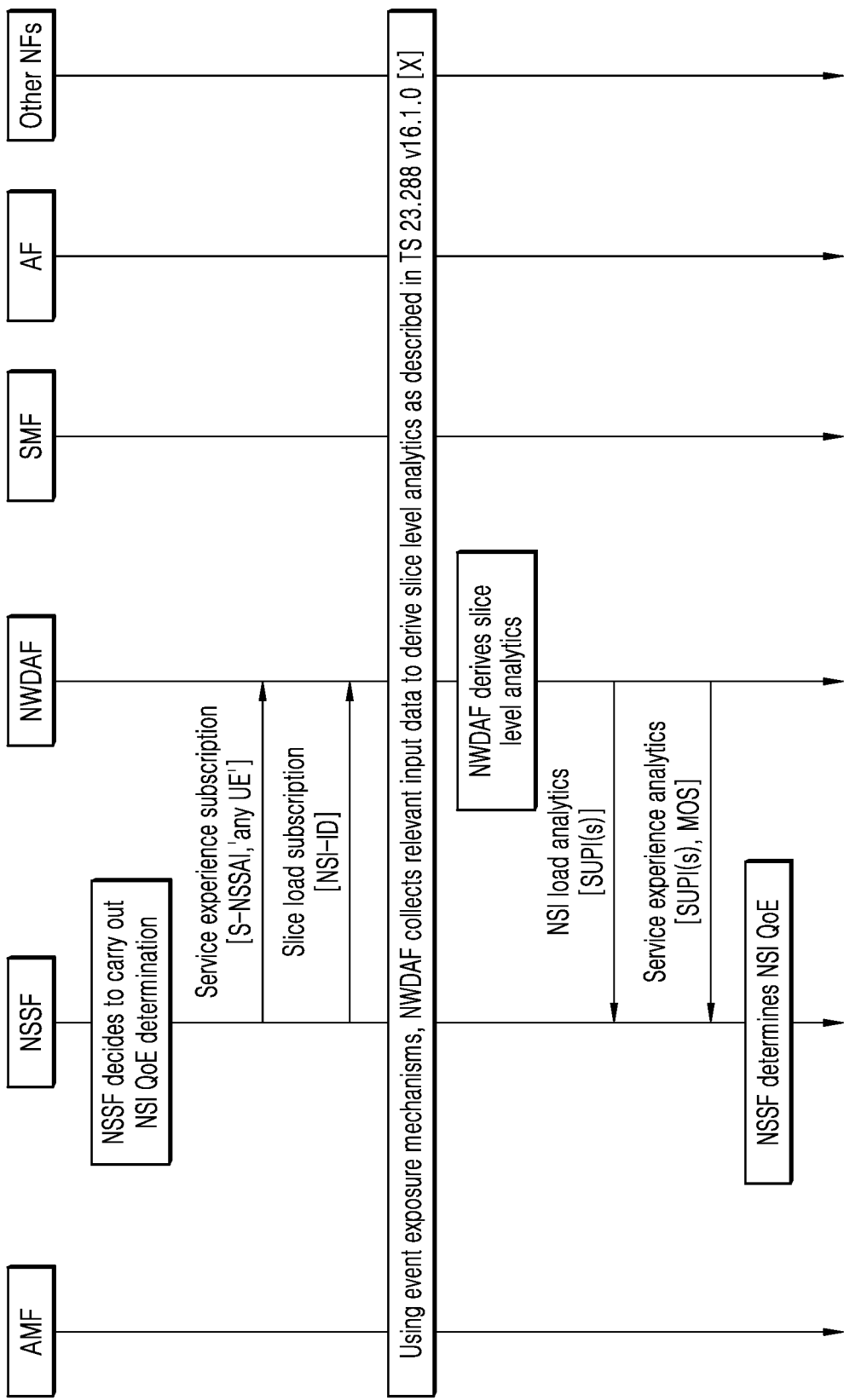
FIG. 7 illustrates a call flow for alternative 2-2 according to an embodiment of the disclosure.

FIG. 7 illustrates a call flow for alternative 2-2 according to an embodiment of the disclosure.

Referring to FIG. 7, this solution assumes NWDAF can still provide the required mapping of SUPIs and NSI ID(s) to determine NSI QoE, but such a mapping is obtained via an alternative type of analytics other than slice QoE. In particular, FIG. 7 illustrates an example where such a mapping is inferred as part of the NWDAF analytics output provided in the context of slice load analytics, where the SUPI(s) allocated to certain NSI ID are provided in the analytics notification message delivered to NSSF by NWDAF.

Alternative 2-3

Figure 8:
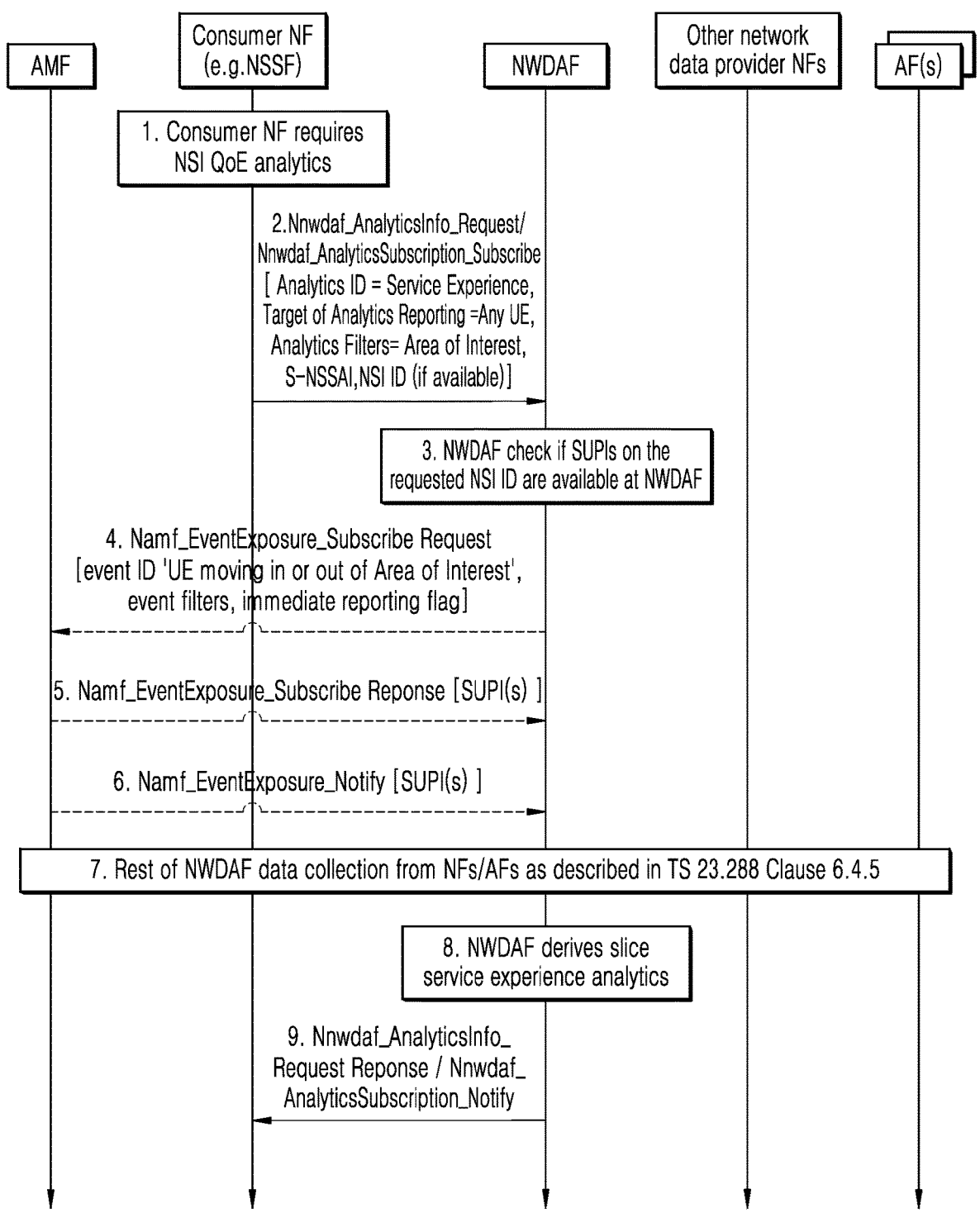
FIG. 8 illustrates a call flow for alternative 2-3 according to an embodiment of the disclosure.

FIG. 8 illustrates a call flow for alternative 2-3 according to an embodiment of the disclosure.

Referring to FIG. 8, an example of this solution, where each of the operations in the flow diagram can be described as follows:

1. A consumer NF may require slice instance analytics (e.g., service experience analytics) for a number of reasons. One example is NSSF requiring them for the purpose of performing load distribution across slice instances (i.e., across different NSI IDs). The skilled person will appreciate that this technique is not limited to load distribution and that analytics may be used for any suitable purpose by any suitable network entity.

2. The consumer NF may request the slice instance service experience analytics from NWDAF (or any other suitable network entity providing similar, corresponding or equivalent analytics). The analytics may be requested in any suitable way. For example, the consumer NF may request analytics: i) by requesting (e.g., asking for one single report in response to a request) analytics, for example Analytics ID 'Service Experience' from NWDAF, or ii) by subscribing (e.g., asking for periodic reports or asking for a report when a predetermined criteria is met) to analytics, for example Analytics ID 'Service Experience' from NWDAF. In certain examples, the Target of Analytics Reporting may be set to "Any UE". In certain examples, one or more filters may be used. For example, the following Analytics Filters (or filtering parameters) may be provided, if available: Area of Interest, S-NSSAI, and/or NSI ID(s). In the example of FIG. 8, the Target of Analytics Reporting is set to "Any UE" and the Analytics Filters Area of Interest, S-NSSAI, and NSI ID are used.

3. In certain examples, NWDAF may determine if it already has certain information required for providing the requested analytics to the consumer NF, for example the information with the SUPIs currently registered on the NSI ID(s) of interest provided by the consumer NF. If not, NWDAF goes to operation 4. Otherwise NWDAF goes directly to operation 7. In certain examples, the determination operation may be omitted and NWDAF may go to operation 4 unconditionally. The skilled person will appreciate that any suitable type of UE ID (e.g., an "internal" ID that is private to the network) may be used as an alternative to SUPI.

4. NWDAF performs operations to obtain certain information required for providing the requested analytics to the consumer NF. For example, NWDAF may request information from the AMF (or any other suitable network entity capable of providing the information). In the example of FIG. 8, NWDAF subscribes to the AMF event on UE mobility by using the event ID 'UE moving in or out of Area of Interest', although the skilled person will appreciate that this may be omitted in certain examples. In certain examples, one or more event filters may also be provided to AMF, which may include, for example, the S-NSSAI and NSI ID(s) of interest. In certain examples, the subscription may also contain the event reporting flag set.

5. In response to the request from NWDAF, AMF may provide relevant information to NWDAF. For example, AMF may respond to the subscription query by NWDAF by providing the current SUPIs (and, if available, GPSI in certain examples) registered on the NSI ID(s) of interest to NWDAF. The skilled person will appreciate that any suitable type of identifier or identity may be used, and that the present technique is not limited to SUPI and/or GPSI. The skilled person will appreciate that any suitable type of UE ID (e.g., "external" ID that is known outside the network) may be used as an alternative to GPSI.

6. In certain examples, subsequent to operation 5, AMF may provide updates to the information provided in operation 5. For example, the updates may be provided continuously or periodically, or an update may be provided in response to a further request (e.g., from NWDAF). For example, AMF may provide the SUPI(s) of UE(s) leaving or entering the Area of Interest as well as being registered or de-registered on the NSI ID(s) of interest. This information may be provided continuously (e.g., when updates occur), periodically or in response to receiving a request from NWDAF.

7. NWDAF may proceed to collect the rest of input data required for analytics (e.g., service experience analytics). For example, NWDAF may collect the data in a manner as described in 3GPP TS 23.288. The skilled person will appreciate that any other suitable way of collecting this data may be used in alternative examples.

8. Using the input data collected, NWDAF may derive the analytics (e.g., slice service experience analytics).

9. NWDAF may provide the analytics (e.g., slice instance service experience analytics) to the consumer NF in any suitable way. For example, NWDAF map provide the analytics by either of the following ways: i) continuously, for example by using the Nnwdaf_AnalyticsSubscription_Notify service operation, or ii) one-off, for example by using Nnwdaf_AnalyticsInfo_Request Response service operation.

From the above detailed explanation, the skilled person will appreciate that certain examples may exhibit one or more of the following features:

A consumer NF (i.e., NSSF in the example of FIG. 8) may request analytics (e.g., slice service experience analytics). The analytics may be requested for any UE (i.e., all UEs) as target of analytics reporting.

If multiple Network Slice instances of the same Network Slice are deployed, associated NSI IDs may be used in addition to S-NSSAI.

An Area Of Interest (for example comprising a set of TAIs) may be provided as input to the procedure to determine statistics (e.g., QoE statistics) and predictions of an NSI ID. The Area of Interest may be provided by the NF consumer of analytics (e.g., NWDAF analytics). In the example of FIG. 8, NSSF is the NF consumer.

As 'any UE' may be the target of analytics reporting to collect the SUPIs (and, if available, GPSIs) in certain examples, NWDAF may subscribe to UE mobility event notifications of AMF. In certain examples, the event exposure request may also include the immediate reporting flag as event reporting information.

To retrieve the SUPIs of interest (and, if available, GPSIs) with the NWDAF event subscription, the UE mobility event of AMF may include new event filters indicating slice-related parameters in addition to Area of Interest, for example S-NSSAI and NSI ID(s) when available.

The event ID of the AMF's UE mobility event is referred to as "UE moving in or out of Area of Interest"' in Table 5.2.2.3.1-1 of 3GPP TS 23.502. In certain examples, new event filters may be required for this previously defined event providing information on the S-NSSAI and, if available, the NSI ID. Examples of these new event filters specifications to support this solution include the following:

```
<Parameter Type=S-NSSAI, Value=S-NSSAI1>

<Parameter Type=NSI ID, Value=NSI ID1>
```

The AMF notification response to such event exposure request may include the list of SUPIs matching the event filters to derive network slice instance service experience analytics at NWDAF.

In addition, the provisioning of analytics (e.g., slice instance service experience analytics) by NWDAF may require considerations on the overhead imposed in the network. For example, the output analytics format may be adjusted in certain examples so that no per-UE information is contained. This is because the number of UEs per Network Slice/Network Slice instance could be very high. In this respect, certain examples may provide one or more of the following:

Optional list of SUPIs from the statistics (e.g., service experience statistics) and predictions for a Network Slice.

Introduction of a mapping in the output analytics format to identify the Network Slice instances deployed within a Network Slice when the operator's deployment choice allows so.

Introduction of a per Network Slice instance metric (e.g., service experience metric), which may be in addition to the per Network Slice service experience.

Introduction of a mapping in the output analytics format to identify the Applications running either on a Network Slice instance or on a Network Slice if only one instance is deployed or Network Slice instance identifiers (NSI IDs) are not available in the network.

Tables 1 and 2 below show NWDAF output analytics formats for slice service experience.

TABLE 1

Service Experience statistics for a Network Slice

| Information | Description |
|---|---|
| S-NSSAI | Identifies the Network Slice for which analytics information is provided. |
| Slice service experience | Service experience across applications and Network slice instances (if applicable) on a Network Slice over the Analytics target period (average, variance). |
| List of service experiences (1 . . . n) (NOTE) | List of observed service experience information for each Network Slice instance. |
| >NSI ID | Identifies the Network Slice instance(s) within the Network Slice if available by the deployment choice of the operator. |
| >Slice instance service experience | Service experience across Applications on a Network Slice instance over the Analytics target period (average, variance). |
| >SUPI list (optional) | List of SUPI(s) for each slice instance service experience. |
| >>Ratio (optional) | Estimated percentage of UEs with similar service experience |
| >List of service experience per Application (1 . . . m) | List of predicted service experience information for each Application |
| >>Application ID | Identification of the Application. |
| >>Service Experience Type | Type of Service Experience analytics, e.g., on voice, video, other. |
| >>Application service experience | Service Experience on one Application on a Network Slice/Network Slice instance over the Analytics target period (average, variance). |
| >SUPI list | List of SUPI(s) for each application service experience. |
| >>Ratio | Estimated percentage of UEs with similar service experience (in the group, or among all UEs). |
| Spatial validity | Area where the estimated Service Experience applies. |
| Validity period | Validity period as defined in clause 6.1.3 of 3GPP TS 23.288. |

TABLE 2

Service Experience predictions for a Network Slice

| Information | Description |
|---|---|
| S-NSSAI | Identifies the Network Slice for which analytics information is provided. |
| >Slice service experience | Service experience across applications and Network slice instances (if applicable) on a Network Slice over the Analytics target period (average, variance). |
| >Probability assertion | Confidence of this prediction. |
| List of service experiences (1 . . . n) (NOTE) | List of observed service experience information for each Network Slice instance. |
| >NSI ID | Identifies the Network Slice instance(s) within the Network Slice if available by the deployment choice of the operator. |
| >Slice instance service experience | Service experience across Applications on a Network Slice instance over the Analytics target period (average, variance). |
| >SUPI list (optional) | List of SUPI(s) for each slice instance service experience. |
| >>Ratio (optional) | Estimated percentage of UEs with similar service experience |
| >List of service experience per Application (1 . . . m) | List of predicted service experience information for each Application |
| >>Application ID | Identification of the Application. |
| >>Service Experience Type | Type of Service Experience analytics, e.g., on voice, video, other. |
| >>Application service experience | Service Experience on one Application on a Network Slice/Network Slice instance over the Analytics target period (average, variance). |
| >SUPI list | List of SUPI(s) for each application service experience. |
| >>Ratio | Estimated percentage of UEs with similar service experience (in the group, or among all UEs). |
| Spatial validity | Area where the estimated Service Experience applies. |
| Validity period | Validity period as defined in clause 6.1.3 of 3GPP TS 23.288. |
| >Probability assertion | Confidence of this prediction. |

(NOTE):
In case Network Slice instances are not deployed or NSI IDs are not available, the size of the list is n = 1. In that case, the NSI ID and slice instance service experience entries in Tables 1 and 2 are optional.

Figure 9:
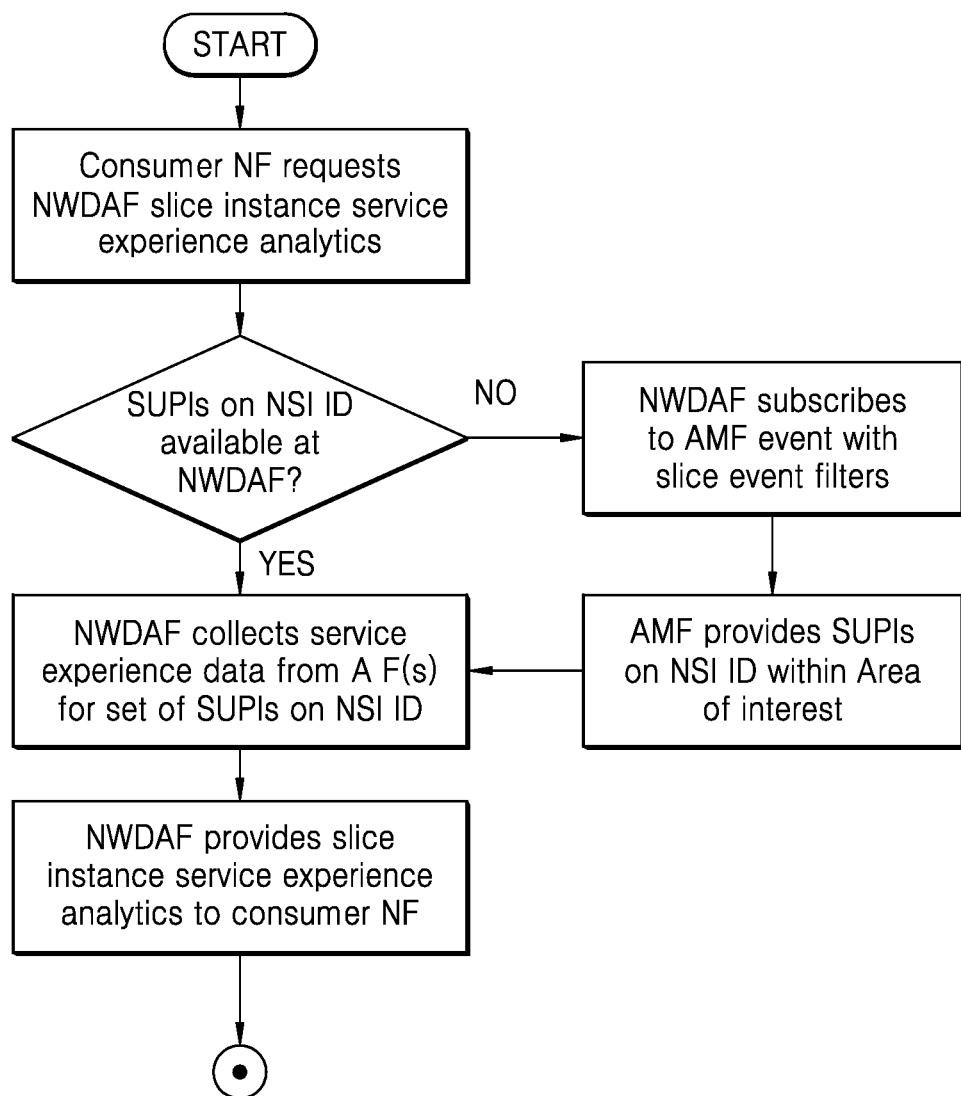
FIG. 9 illustrates a flowchart according to an embodiment of the disclosure.

FIG. 9 illustrates a flowchart according to an embodiment of the disclosure, for example corresponding to the example of FIG. 8.

Figure 10:
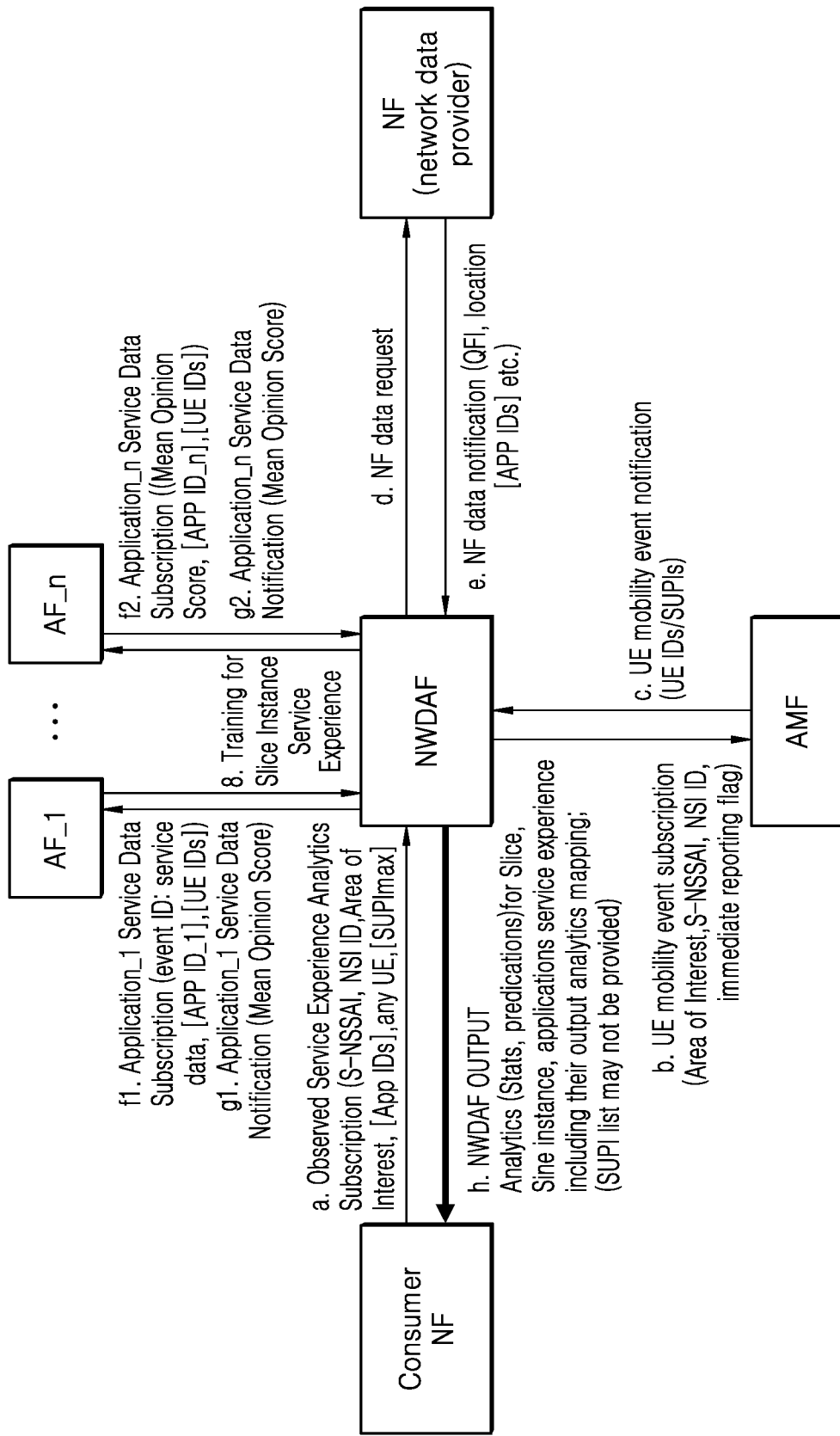
FIG. 10 illustrates a block diagram according to an embodiment of the disclosure.

FIG. 10 illustrates a block diagram according to an embodiment of the disclosure, for example corresponding to the example of FIG. 8.

Referring to FIGS. 9 and 10, operations d and e may be required in some examples for NWDAF to provide application and network slice service experience analytics as well. In certain examples, the following data may need to be retrieved from other network data provider NFs (see clause 6.4.2 in TS 23.288):

SMF: DNN (Data Name Network), Application ID, IP filter information, QFI (QoS Flow Identifier)

Figure 11:
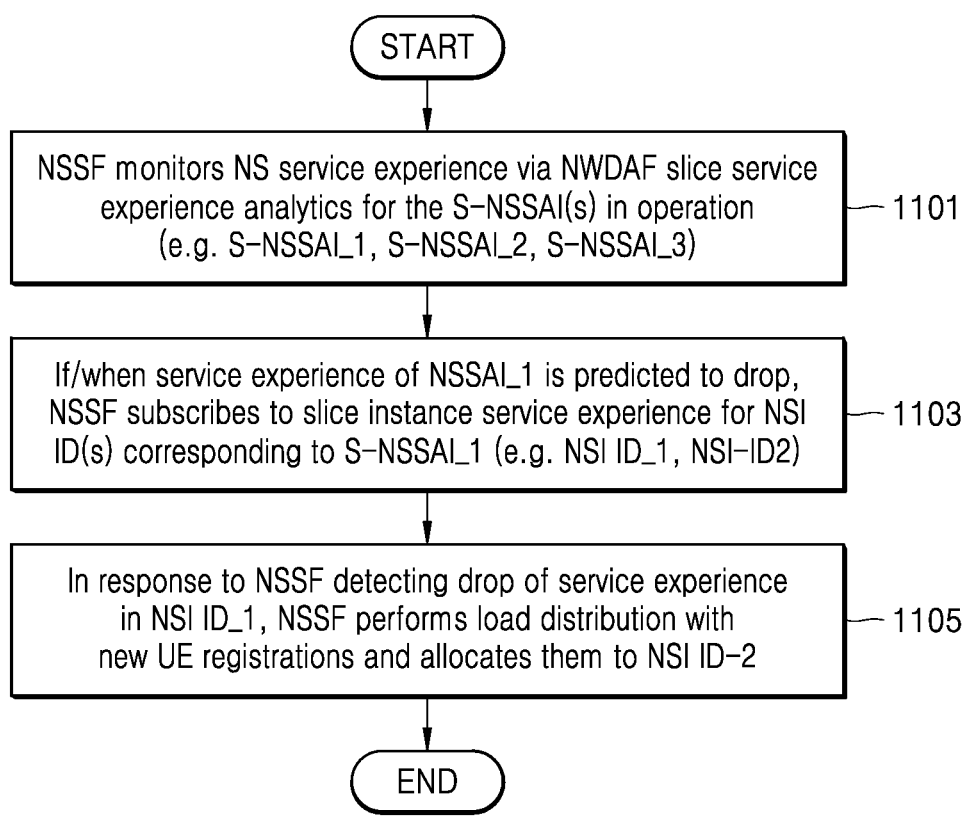
FIG. 11 is a flow diagram according to an embodiment of the disclosure.

UPF (not in Rel-16): QoS flow Bit Rate, QoS flow Packet Delay, Packet retransmission OAM: timestamp, RSRP, RSRQ, SINR A number of use cases can be defined for various examples of the disclosure. An example use case is "Slice Service Level Agreement guarantee via Load Distribution":

FIG. 11 is a flow diagram according to an embodiment of the disclosure.

Referring to FIG. 11, multiple slice instances in one slice are deployed by the operator to i) cover different geographic areas, and ii) to provide slice resilience to customers. Then, slice instance service experience analytics can be used to guarantee slice Service Level Agreement (SLA) in the 5GC. As an example, the consumer NF can be NSSF. The use case procedural description is as follows and illustrated in FIG. 11:

NSSF monitors Network Slice service experience via NWDAF slice service experience analytics for the S-NSSAI(s) in operation (e.g., S-NSSAI_1, S-NSSAI_2, S-NSSAI_3) (operation 1101).

If/when the service experience of S-NSSAI_1 is predicted to drop, NSSF subscribes to slice instance service experience for NSI ID(s) corresponding to 5-NSSAI_1 (e.g., NSI ID_1, NSI_ID2), for example using the techniques described herein (operation 1103).

NSSF may detect a drop of service experience in NSI ID_1. Hence, NSSF performs load distribution with new UE registrations and allocates them to NSI ID_2 (operation 1105).

As a result, NSSF assists with guaranteeing the SLA of the overall Network Slice.

Figure 12:
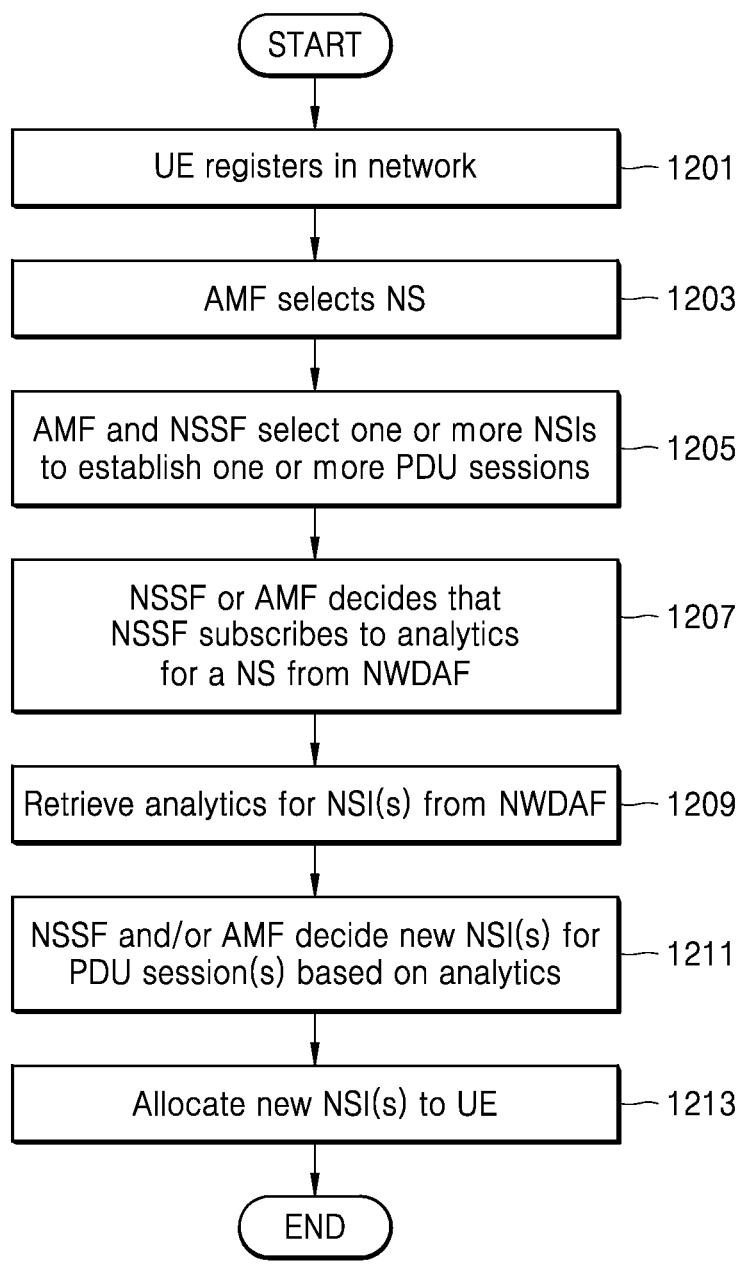
FIG. 12 is a flow diagram of an implementation in a network of a use case illustrated in FIG. 11 according to an embodiment of the disclosure.

FIG. 12 is a flow diagram of an implementation in a network of a use case illustrated in FIG. 11 according to an embodiment of the disclosure.

Referring to FIG. 12, the example use case described above may be implemented in the network, for example by performing the following operations encompassing the network full operation:

1. The UE registers in the network by using any suitable method, for example the standard procedures defined in 3GPP TS 23.502 (operation 1201). The selected AMF should support the Network Slice(s) supported by the UE, for example as described in 3GPP TS 23.501.

2. The AMF selects a Network Slice, identified by an S-NSSAI, supported by the UE (operation 1203).

3. The AMF in coordination with NSSF selects one or several Network Slice instance(s) to establish one or more PDU Session(s) on the required Data network (operation 1205).

4. NSSF or AMF decides that NSSF should subscribe to analytics (e.g., Observed Service Experience analytics) for a Network Slice from NWDAF, for example to track QoE of one or several Network Slice instance(s) (operation 1207).

5. Service experience data analytics for Network Slice instance(s) are retrieved from NWDAF (operation 1209). This may be triggered according to any suitable technique, for example the procedure disclosed in relation to FIG. 10 and/or FIG. 8.

6. Based on the received analytics, NSSF and/or AMF decide new Network Slice instance(s) for the PDU session(s) of the UE (operation 1211).

7. The new Network Slice instance(s) is allocated to the UE (operation 1213).

Certain examples of the disclosure may be provided in the form of an apparatus/device/network entity configured to perform one or more defined network functions and/or a method therefor. Certain examples of the present disclosure may be provided in the form of a system (e.g., a network) comprising one or more such apparatuses/devices/network entities, and/or a method therefor.

Figure 13:
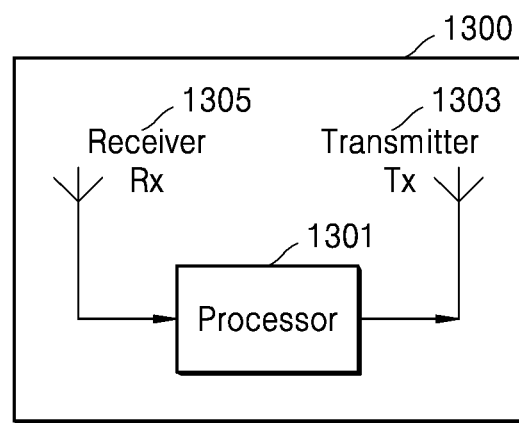
FIG. 13 is a block diagram of a network entity according to an embodiment of the disclosure.

FIG. 13 is a block diagram of a network entity according to an embodiment of the disclosure.

Referring to FIG. 13, a block diagram of a network entity that may be used in examples of the disclosure is illustrated. For example, the AMF, NSSF, NWDAF, SMF, AF and/or other NFs may be provided in the form of the network entity illustrated in FIG. 13. The skilled person will appreciate that the network entity illustrated in FIG. 13 may be implemented, for example, as a network element on a dedicated hardware, as a software instance running on a dedicated hardware, or as a virtualized function instantiated on an appropriate platform, e.g., on a cloud infrastructure.

The entity 1300 comprises a processor (or controller) 1301, a transmitter 1303 and a receiver 1305. The receiver 1305 is configured for receiving one or more messages from one or more other network entities, for example one or more of the messages illustrated in FIGS. 2 to 12. The transmitter 1303 is configured for transmitting one or more messages to one or more other network entities, for example one or more of the messages illustrated in FIGS. 2 to 12. The processor 1301 is configured for performing operations as described above in relation to FIGS. 2 to 12. For example, the processor 1301 is configured for performing the operations of an AMF, NSSF, NWDAF, SMF, AF and/or other NF.

The techniques described herein may be implemented using any suitably configured apparatus and/or system. Such an apparatus and/or system may be configured to perform a method according to any aspect, embodiment of the disclosure, example or claim disclosed herein. Such an apparatus may comprise one or more elements, for example one or more of receivers, transmitters, transceivers, processors, controllers, modules, units, and the like, each element configured to perform one or more corresponding processes, operations and/or method operations for implementing the techniques described herein. For example, an operation/function of X may be performed by a module configured to perform X (or an X-module). The one or more elements may be implemented in the form of hardware, software, or any combination of hardware and software.

While the disclosure has been shown and described with reference to certain examples, it will be understood by those skilled in the art that various changes in form and detail may be made therein without departing from the scope of the disclosure, as defined by the appended claims.

Certain examples of the disclosure provide a method for determining and/or predicting quality of experience (QoE) for a network slice instance (NSI) in a network comprising one or more network entities, the method comprising obtaining first information for determining a mapping between a set of one or more user equipment (UEs) and a set of one or more NSIs, obtaining second information for determining the QoE of the set of UEs, and determining the QoE for an NSI based on the first information and the second information.

In certain examples, obtaining the first information may comprise receiving, from a first network entity, information indicating which UEs have been allocated to which NSIs.

In certain examples, the method may further comprise transmitting, to the first network entity, a request message for requesting the information indicating which UEs have been allocated to which NSIs.

In certain examples, obtaining the first information may comprise receiving, from a first network entity, one or more messages, each message indicating that a UE has been newly allocated to an NSI.

In certain examples, the method may further comprise transmitting, to the first network entity, a subscription request message for subscribing to event notification information indicating when a UE has been newly allocated to an NSI.

In certain examples, obtaining the first information may comprise receiving, from a second network entity, a message comprising information indicating which UEs have active PDU sessions, and information indicating the NSIs allocated to the active PDU sessions.

In certain examples, the method may further comprise transmitting, to the second network entity, a subscription request message for subscribing to event notification information indicating when a PDU session has been newly established.

In certain examples, obtaining the second information may comprise receiving QoE analytics information corresponding to the UEs from a third network entity.

In certain examples, the method may further comprise transmitting, to the third network entity, a subscription request message for subscribing to the QoE analytics information.

In certain examples, obtaining the first information, obtaining the second information, and determining the QoE may be performed by the same network entity.

In certain examples, the obtaining the first information, obtaining the second information, and determining the QoE are performed by a third network entity or a fourth network entity.

In certain examples, obtaining the first information and obtaining the second information may be performed by the same network entity (A), and determining the QoE may be performed by a different network entity (B) that receives the obtained first and second network information.

In certain examples, obtaining the first information and obtaining the second information may be performed by a third network entity, and determining the QoE may be performed by a fourth network entity.

In certain examples, the method may further comprise transmitting the determined QoE from a network entity to another network entity.

In certain examples, one or more of, the network may be a 3GPP 5GC network, the first network entity may be an Access and Mobility Management Function (AMF) entity, the second network entity may be a session management function (SMF) entity, the third network entity may be a network data analytics function (NWDAF) entity, the fourth network entity may be network slice selection function (NSSF) entity, the information indicating which UEs have been allocated to which NSIs (e.g., Namf_Communication_UENSIAssignment Response or Namf_Communication_NSIUEAssignment Response) may comprise one or more NSI IDs and one or more SUPIs corresponding to the NSI IDs, the request message (e.g., Namf_Communication_UENSIAssignment Request or Namf_Communication_NSIUEAssignment_Request) for requesting the information indicating which UEs have been allocated to which NSIs may comprise one or more NDI IDs or one or more SUPIs, the message (e.g., Namf_EventExposure_Notify) indicating that a UE has been newly allocated to an NSI may comprise one or more NSI IDs and/or one or more SUPIs corresponding to the NSI IDs, the subscription request message (e.g., Namf_EventExposure_Subscribe Request) for subscribing to event notification information indicating when a UE has been newly allocated to an NSI may comprise indications of the Area of Interest, S-NSSAI and NSI ID(s) as event filters, the event ID (e.g., 'NSI ID(s) allocation' or 'Area of Interest'), 'any UE', and immediate reporting flag, the subscription response message (e.g., Namf_EventExposure_Subscribe Response) for subscribing to event notification information indicating when a UE has been newly allocated to NSI(s) may comprise the SUPIs of the UEs allocated to the NSI ID(s) indicated in the subscription request message, the message (e.g., Nsmf_EventExposure_Notify) comprising information indicating which UEs have active PDU sessions, and information indicating the NSIs allocated to the active PDU sessions may comprise one or more NSI IDs, one or more corresponding SUPIs and one or more corresponding PDU session IDs, the subscription request message (e.g., Nsmf_EventExposure_Subscribe) for subscribing to event notification information indicating when a PDU session has been newly established may comprise indications of 'eventID', 'NSI ID(s) allocation', and 'any UE', the QoE analytics information may comprise one or more SUPIs and one or more corresponding MOSs, the QoE analytics information may further comprise S-NSSAI and one or more NSI IDs, the subscription request message for subscribing to the QoE analytics information may comprise S-NSSAI and an indication of 'any UE', the subscription request message for subscribing to the QoE analytics information may further comprise one or more NSI IDs.

In certain examples, the UEs may be filtered based on an Area of Interest.

Certain examples of the disclosure provide a network comprising a first entity, a second entity and a third entity, the network being configured to perform a method according to any of the preceding examples.

Certain examples of the disclosure provide a computer program comprising instructions which, when the program is executed by a computer, cause the computer to carry out a method according to any of the preceding examples.

Certain examples of the disclosure provide a computer-readable data carrier having stored there on a computer program according to the preceding example.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network data analytics function (NWDAF) entity in a wireless communication system, the method comprising:
   receiving, from a consumer network entity, a request for analytics information associated with a service experience for a network slice, wherein the request for the analytics information includes a target of analytics reporting;
   in case that the target of analytics reporting is set to any user equipment (UE) transmitting, to an access and mobility management function (AMF) entity, information for subscribing to an event using an event identifier (ID) related to a UE mobility and one or more event filters related to network slice information; and
   receiving, from the AMF entity, information associated with one or more UE related to the one or more event filters.

2. The method of claim 1, wherein the one or more UE IDs match with the one or more event filters.

3. The method of claim 1, wherein the request indicates the network slice information.

4. The method of claim 1, further comprising:
   transmitting, to at least one application function (AF), a request for service experience information by using the one or more UE IDs.

5. The method of claim 4, further comprising:
   receiving, from the at least one AF, the service experience information;
   determining the analytics information based on the service experience information; and
   transmitting, to the consumer network entity, the analytics information.

6. A method performed by an access and mobility management function (AMF) entity in a wireless communication system, the method comprising:
   in case that a target of analytics reporting is set to any user equipment (UE), receiving, from a network data analytics function (NWDAF) entity, information for subscribing to an event sing an event identifier (ID) and one or more event filters related to network slice information; and
   transmitting, to the NWDAF entity, information associated with one or more UE IDs related to the one or more event filters,
   wherein the target of analytics reporting is included in a request from a consumer network entity, for analytics information associated with a service experience for a network slice.

7. The method of claim 6, further comprising:
   determining the one or more UE IDs matching the one or more event filters.

8. The method of claim 6, wherein the request indicates the network slice information.

9. The method of claim 6, wherein the one or more UE IDs are used to request at least one application function (AF) for service experience information.

10. The method of claim 9, wherein the analytics information is determined based on the service experience information and transmitted to the consumer network entity.

11. A network data analytics function (NWDAF) entity in a wireless communication system, the NWDAF entity comprising:
- a transceiver; and
- at least one processor configured to:
  - receive, from a consumer network entity via the transceiver, a request for analytics information associated with a service experience for a network slice, wherein the request for the analytics information includes a target of analytics reporting;
  - in case that the target of analytics reporting is set to any user equipment (UE), transmit, to an access and mobility management function (AMF) entity via the transceiver, information for subscribing to an event using an event identifier (ID) and one or more event filters related to network slice information; and
  - receive, from the AMF entity via the transceiver, information associated with one or more UE IDs related to the one or more event filters.

12. An access and mobility management function (AMF) entity in a wireless communication system, the AMF entity comprising:
- a transceiver; and
- at least one processor configured to:
  - in case that a target of analytics reporting is set to any user equipment (UE), receive, from a network data analytics function (NWDAF) entity via the transceiver, information for subscribing to an event using an event identifier (ID) and one or more event filters related to network slice information; and
  - transmit, to the NWDAF entity via the transceiver, information associated with one or more UE IDs related to the one or more event filters,
- wherein the target of analytics reporting is included in a request from a consumer network entity, for analytics information associated with a service experience for a network slice.

\* \* \* \* \*